United States Patent
Fukuda et al.

(10) Patent No.: US 12,155,769 B2
(45) Date of Patent: Nov. 26, 2024

(54) INFORMATION MATCHING SYSTEM AND INFORMATION MATCHING METHOD

(71) Applicant: NEC Corporation, Tokyo (JP)

(72) Inventors: Haruna Fukuda, Tokyo (JP); Hiroto Tamiya, Tokyo (JP); Toshihiko Okamura, Tokyo (JP); Toshiyuki Isshiki, Tokyo (JP); Masahiro Nara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 324 days.

(21) Appl. No.: 17/641,884

(22) PCT Filed: Oct. 4, 2019

(86) PCT No.: PCT/JP2019/039272
§ 371 (c)(1),
(2) Date: Mar. 10, 2022

(87) PCT Pub. No.: WO2021/064981
PCT Pub. Date: Apr. 8, 2021

(65) Prior Publication Data
US 2023/0006829 A1    Jan. 5, 2023

(51) Int. Cl.
*H04L 9/06*    (2006.01)
*G06F 21/32*    (2013.01)
(Continued)

(52) U.S. Cl.
CPC ............ *H04L 9/3231* (2013.01); *H04L 9/008* (2013.01); *H04L 9/0869* (2013.01)

(58) Field of Classification Search
CPC ..... H04L 9/3231; H04L 9/008; H04L 9/0869; H04L 9/0662; G06F 21/32; G09C 1/00
See application file for complete search history.

(56) References Cited

U.S. PATENT DOCUMENTS

| | | | |
|---|---|---|---|
| 2009/0279694 A1* | 11/2009 | Takahashi | G06F 17/16 380/278 |
| 2012/0207299 A1 | 8/2012 | Hattori et al. | |
| 2016/0352510 A1* | 12/2016 | Morikawa | G09C 1/00 |

FOREIGN PATENT DOCUMENTS

| | | | |
|---|---|---|---|
| JP | 2009-272995 A | | 11/2009 |
| JP | 2014206696 A | * | 10/2014 |

(Continued)

OTHER PUBLICATIONS

International Search Report for PCT Application No. PCT/JP2019/039272, mailed on Dec. 24, 2019.
(Continued)

*Primary Examiner* — Joseph P Hirl
*Assistant Examiner* — Aayush Aryal

(57) ABSTRACT

In order to provide an information matching system achieving an information matching scheme that takes a lower cost and uses secure biometric information, the information matching system includes a concealment apparatus, a decryption apparatus, and a similarity calculating apparatus. The concealment apparatus transmits, to the similarity calculating apparatus, concealed information including information concealing obtained matching information by linear conversion using random numbers. The similarity calculating apparatus calculates, from obtained one or more pieces of registration information and the concealed information received from the concealment apparatus, a concealed similarity which is a value concealing a similarity between the matching information and the registration information, and to transmit the calculated concealed similarity to the decryption apparatus. The decryption apparatus calculates the similarity between the matching information and the registration information from the concealed similarity received
(Continued)

from the similarity calculating apparatus, using the random numbers used by the concealment apparatus.

7 Claims, 12 Drawing Sheets

(51) Int. Cl.
*G09C 1/00* (2006.01)
*H04L 9/00* (2022.01)
*H04L 9/08* (2006.01)
*H04L 9/32* (2006.01)

(56) References Cited

FOREIGN PATENT DOCUMENTS

| | | | |
|---|---|---|---|
| JP | 2015192352 A | * | 11/2015 |
| JP | 2016-080766 A | | 5/2016 |
| WO | 2011/052056 A1 | | 5/2011 |
| WO | 2016/203555 A1 | | 12/2016 |

OTHER PUBLICATIONS

English translation of Written opinion for PCT Application No. PCT/JP2019/039272, mailed on Dec. 24, 2019.
Taher ElGamal, "A public key cryptosystem and a signature scheme based on discrete logarithms", IEEE transactions on information theory 31.4, Jul. 1985, pp. 469-472.

* cited by examiner

INFORMATION MATCHING SYSTEM AND INFORMATION MATCHING METHOD

This application is a National Stage Entry of PCT/JP2019/039272 filed on Oct. 4, 2019, the contents of all of which are incorporated herein by reference, in their entirety.

BACKGROUND

Technical Field

The present invention relates to an information matching system and an information matching method.

Background Art

Personal authentication is means for confirming identicalness between a registered person and a person to be authenticated. Information related to a registered person that is stored in advance is checked against information related to a person to be authenticated that is acquired every authentication to perform the personal authentication.

Biometric authentication as a method of personal authentication uses, physical characteristics such as a face, a fingerprint, and an iris to perform the authentication. To be more specific, data called a biometric feature is extracted from a biological body to be used for the authentication. The biometric feature extracted from the biological body is slightly different for every extraction. As such, in authentication, a biometric feature extracted from a registered person is compared with a biometric feature extracted from a person to be authenticated, and when these biometric features are recognized to be sufficiently similar to each other, the authentication is result in success. A similarity determination method depends on a biometric feature extraction scheme, and in general, a biometric feature is expressed in a form of a vector, a similarity is calculated by way of an inner product of two biometric features, a Euclidean distance, a Hamming distance, and the like, and then, in a case that the similarity is included in a predetermined range, two biometric features are determined to be sufficiently similar.

Merits of the biometric authentication, as compared to authentication by way of memorizing a password and the like, or authentication by way of carrying an IC card and the like, include higher convenience that an active preparation by a user such as the memorization and the carrying is not necessary for inputting authentication information, and higher security that the authentication information is not likely to be used by other persons. In recent years, the biometric authentication has been increasingly used as means for the personal authentication, along with development in technologies such as a biometric feature extraction method.

On the other hand, the biometric authentication has a demerit that biometric information unvarying whole life long cannot be changed even if leaked. A biometric feature of biological body is defined to fall under the personal information in the General Data Protection Regulation in Europe or the Personal Information Protection Law in Japan. Data falling under the personal information has a restriction in storing or handling such as provision to the outside. Not only the restriction by law or the like but also an attention for being socially accepted is often demanded.

Therefore, a biometric authentication scheme has been eagerly studied that the biometric information is stored in a concealed form, and an authentication result can be determined with the concealed state being kept. Furthermore, to make use of the merits of the biometric authentication, a preferable method is one in which the user does not need to memorize or carry anything other than the biometric information. As means for achieving the determination with the concealed state being kept, schemes using a public key cryptosystem with additive homomorphism are known.

The public key cryptosystem includes three algorithms of a key generation algorithm (KeyGen), an encryption algorithm (Enc), and a decryption algorithm (Dec).

The key generation algorithm uses a parameter indicating a strength of a key, called a security parameter, to generate an encryption key ek and a decryption key dk. This operation can be expressed as a relationship below, where the security parameter is represented by $\kappa$.

$\text{KeyGen}(\kappa) \rightarrow (ek, dk)$

The encryption algorithm generates a ciphertext c as a result of encrypting a plaintext message m by use of the encryption key ek. This can be expressed as a relationship below.

$\text{Enc}(ek, m) \rightarrow c$

The decryption algorithm generates m' as a result of decrypting the ciphertext c by use of the decryption key dk. This can be expressed as a relationship below.

$\text{Dec}(dk, c) \rightarrow m'$

The public key cryptosystem needs to be able to correctly decrypt the ciphertext. Specifically, as for any pair of encryption key ek and decryption key dk generated by the key generation algorithm, any message m which is encrypted by use of the encryption key ek to be a ciphertext c, and decryption result m' which is generated from the ciphertext c by use of the decryption key dk, a is required to be equal to m. Specifically, for $\text{KeyGen}(\kappa) \rightarrow (ek, dk)$, $\text{Dec}(dk, \text{Enc}(ek, m)) \rightarrow m$ needs to be satisfied for any m.

In the public key cryptosystem, any device having an encryption key can perform the encryption algorithm, but cannot successfully perform the decryption algorithm without a decryption key.

A public key cryptosystem with homomorphism (hereinafter, referred to as a homomorphic public key encryption scheme) includes a homomorphic operation algorithm (Hom) in addition to the algorithms of the public key encryption scheme.

The homomorphic operation algorithm generates ciphertexts as a result of an operation performed on messages corresponding to a plurality of input ciphertexts by use of the encryption key. When two messages can be input, the algorithm can be expressed as a relationship below.

$\text{Hom}(ek, c_1, c_2) \rightarrow c$

For example, in a case of a public key encryption scheme with additive homomorphism, the ciphertext c generated from the ciphertext $c_1$ of a message $m_1$ by use of the encryption key ek and the ciphertext $c_2$ of a message $m_2$ by use of the encryption key ek is a ciphertext of $m_1 + m_2$. Specifically, assuming that, with respect to $\text{KeyGen}(\kappa) \rightarrow (ek, dk)$, $\text{Enc}(ek, m_1) \rightarrow c_1, \text{Enc}(ek, m_2) \rightarrow c_2$ are satisfied for any $m_1$ and $m_2$, $\text{Dec}(dk, \text{Hom}(ek, c_1, c_2)) \rightarrow m_1 + m_2$ is satisfied.

The known public key encryption scheme with additive homomorphism includes the elliptic curve Elgamal encryption, or the like. Algorithms of the elliptic curve Elgamal encryption disclosed in NPL 1 operate as below.

The algorithms of the elliptic curve Elgamal encryption operate as below.

The key generation algorithm firstly receives a security parameter κ as an input. Next, the key generation algorithm chooses a κ-bit prime number q at random to choose a generator G of a group with an order q on an elliptic curve E. Next, the key generation algorithm chooses an integer x equal to or more than 1 and less than q uniformly at random, and obtains H=[x]G. Finally, the key generation algorithm outputs an encryption key ek=(κ, q, E, G, H) and a decryption key dk=(ek, x).

The encryption algorithm firstly receives the encryption key ek=(κ, q, G, g, H) and a message m as inputs. Next, the encryption algorithm chooses an integer r equal to or more than 1 and less then q uniformly at random, and obtains $C_a := [r]G$, and $C_b := [m]G + [r]H$. Finally, the encryption algorithm outputs a ciphertext $c = (C_a, C_b)$.

The decryption algorithm firstly receives the decryption key dk=(ek, x) and the ciphertext $c=(C_a, C_b)$ as inputs. Next, the decryption algorithm calculates $M' = C_b [x] C_a$. Finally, the decryption algorithm outputs the decryption result $m' = -D \log_G(M')$. Here, D log is a function satisfying $D \log_G([x]G) = x$.

As for the ciphertext $c=(C_a, C_b)=([r]G, [m]G+[r]H)$ of the message m, the ciphertext c can be correctly decrypted to m by the decryption algorithm of the elliptic curve Elgamal encryption, which can be confirmed by the equation below.

$$M' = C_b - [x] \cdot C_a = ([m]G + [r]H) - [x] \cdot ([r]G) = [m]G + [r]([x] \cdot G) - [x] \cdot ([r]G) = [m]G$$

The homomorphic operation algorithm firstly receives the encryption key ek=(κ, q, G, g, h), a first ciphertext $c_1 = (C_{1,a}, C_{1,b})$, and a second ciphertext $c_2 = (C_{2,a}, C_{2,b})$ as inputs. Next, the homomorphic operation algorithm calculates $C_a = C_{1,a} + C_{2,a}$ and $C_b = C_{1,b} + C_{2,b}$. Finally, the homomorphic operation algorithm outputs a homomorphic operation result $c = (C_a, C_b)$.

For ciphertexts ($C_{1,a} = [r]G$, $C_{1,b} = [m_1]G + [r]H$) of the message $m_1$ and ciphertexts ($C_{2,a} = [s]G$, $C_{2,b} = [m_2]G + [s]H$) of the message $m_2$, two equations below are satisfied.

$$C_a = [r+s] \cdot G$$

$$C_b = [m_1 + m_2]G + [r+s]H$$

Accordingly, c is a ciphertext of $m_1 + m_2$, and the elliptic curve Elgamal encryption has additive homomorphism.

The biometric authentication technology is utilized for not only the authentication but also entrance control or monitoring of a building, security check in an airport, and the like. In such use cases, a database is prepared in advance, in which information including biometric information of a person to be a target of the entrance control or the monitoring is registered. When biometric information of a person is acquired by a sensor such as a camera, the biometric authentication technology is utilized to check whether or not the person is registered in the database, or identify who the person is among the registered persons.

In such use cases, some cases exist that managers (managing organizations) of an apparatus equipped with the sensor such as a camera and the database are different from each other. For example, in a case that in an office building occupied by a plurality of business operators, the business operators use entrance gates of a management company of the office building and manage attendance and leaving of employees of the business operators, an entrance gate device is managed by the office building management company, but a database is managed by each of the business operators. In the airport also, there is a case that the gate device is managed by a company managing facilities of the airport, and the database is managed by an airline company.

As such, a scheme is demanded that a result can be determined while biometric information of a server managing the database and biometric information of an apparatus including the sensor are concealed from each other. For example, by using an additive homomorphic public key cryptosystem, the above determination scheme can be achieved as below.

The server managing the database encrypts biometric features of a plurality of persons stored in the database using the additive homomorphic public key cryptosystem to send the encrypted biometric features to the apparatus including the sensor (step 1).

The sensor apparatus acquires a biological body biometric feature to be matched and calculates ciphertexts of similarities of the plurality of persons by using the additive homomorphic operation. The calculated encrypted similarities are sent to the server (step 2).

The server decrypts the encrypted similarities of the plurality of persons to obtain similarities. The server finds, among the obtained similarities of the plurality of persons, a value included in a predefined range to identify information of the person to be matched included in the plurality of persons stored in the database (step 3).

PTL 1 describes that a system and method for confidentially searching for similarity capable of efficiently determining similarity of data while keeping concealability are provided. PTL 2 describes that secure identity authentication with a lower possibility of plaintext theft can be realized.

CITATION LIST

Patent Literature

[PTL 1] WO 2016/203555
[PTL 2] WO 2011/052056

Non Patent Literature

[NPL 1] Taher ElGamal. "A public key cryptosystem and a signature scheme based on discrete logarithms." IEEE transactions on information theory 31.4 (1985): 469-472.

SUMMARY

Technical Problem

In a person matching scheme by biological matching using the additive homomorphic public key cryptosystem described above, the sensor apparatus calculates the encrypted similarities of the plurality of persons by using the homomorphic operation in step 2. Depending on a form of the biometric feature or a calculation method of the similarity, calculation of a similarity of one set of biometric features requires a number of times of the homomorphic operations, where the number depends on the number of dimension of the biometric feature. Specifically, in step 2, the sensor apparatus is required to perform the number of times of the homomorphic operations, where the number depends on a product of the number of persons stored in the database and the number of dimension of the biometric feature.

The homomorphic operation of the homomorphic public key cryptosystem is based on a group operation, but the group operation involves a larger calculation cost compared to the four basic operation operators or the like. In terms of actual operation, the sensor apparatus is often relatively powerless in computation power.

As such, an information matching scheme is demanded that securely uses the biometric information and can be realized with the cost less than that of the scheme using an additive homomorphic public key cryptosystem described above. An example object of the present invention is to provide an information matching system and an information matching method that solve the problems described above.

Solution to Problem

According to a first aspect of the present invention, an information matching system is provided, the information matching system including a concealment apparatus, a decryption apparatus, and a similarity calculating apparatus, wherein the concealment apparatus is configured to transmit, to the similarity calculating apparatus, concealed information including information concealing obtained matching information by linear conversion using random numbers, the similarity calculating apparatus is configured to calculate, from obtained one or more pieces of registration information and the concealed information received from the concealment apparatus, a concealed similarity which is a value concealing a similarity between the matching information and the registration information, and to transmit the calculated concealed similarity to the decryption apparatus, and the decryption apparatus is configured to calculate the similarity between the matching information and the registration information from the concealed similarity received from the similarity calculating apparatus, using the random numbers used by the concealment apparatus.

According to a second aspect of the present invention, an information matching method is provided in an information matching system including a concealment apparatus, a decryption apparatus, and a similarity calculating apparatus, the method including transmitting, by the concealment apparatus, to the similarity calculating apparatus, concealed information including information concealing obtained matching information by linear conversion using random numbers, calculating, by the similarity calculating apparatus, from obtained one or more pieces of registration information and the concealed information received from the concealment apparatus, a concealed similarity which is a value concealing the similarity between the matching information and the registration information, and to transmit the calculated concealed similarity to the decryption apparatus, and calculating, by the decryption apparatus, the similarity between the matching information and the registration information from the concealed similarity received from the similarity calculating apparatus, using the random numbers used by the concealment apparatus.

Advantageous Effects of Invention

According to the aspects of the present invention, provided are an information matching system and an information matching method achieving an information matching scheme that uses biometric information with a lower cost and in a secure way. Note that, according to the present invention, instead of or together with the above effects, other effects may be exerted.

DESCRIPTION OF THE EXAMPLE EMBODIMENTS

Figure 1:
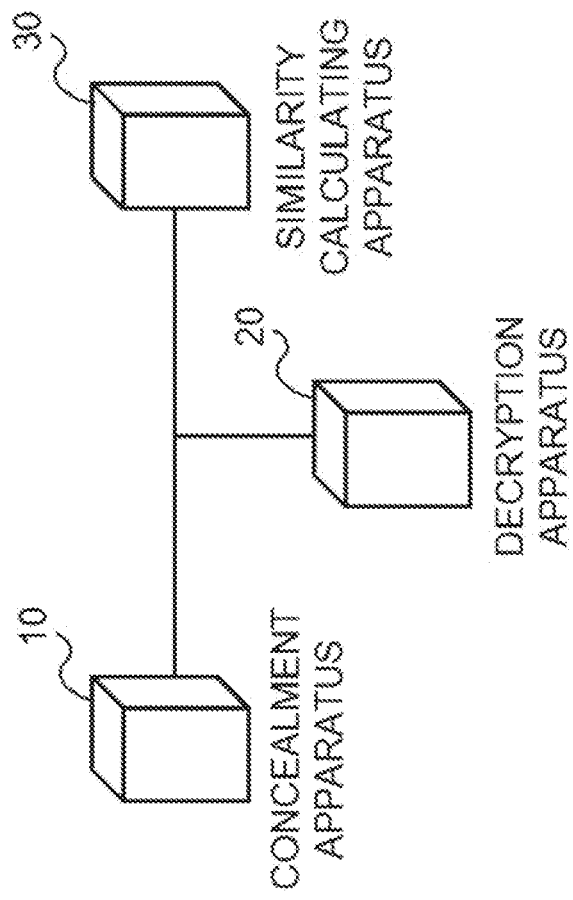
FIG. 1 is a diagram for describing an overview of an example embodiment.

First, an overview of an example embodiment will be described. Note that reference signs in the drawings provided in the overview are for the sake of convenience for each element as an example to promote better understanding, and description of the overview is not to impose any limitations. Note that, in the Specification and drawings, elements to which similar descriptions are applicable are denoted by the same reference signs, and overlapping descriptions may hence be omitted.

The information matching system according to an embodiment includes a concealment apparatus 10, a decryption apparatus 20, and a similarity calculating apparatus 30 (see FIG. 1). The concealment apparatus 10 transmits, to the similarity calculating apparatus 30, concealed information including information concealing obtained matching information by linear conversion using random numbers. The similarity calculating apparatus 30 calculates, from obtained one or more pieces of registration information and the concealed information received from the concealment apparatus 30, a concealed similarity which is a value concealing the similarity between the matching information and the registration information, and to transmit the calculated concealed similarity to the decryption apparatus 20. The decryption apparatus 20 calculates the similarity between the matching information and the registration information from the concealed similarity received from the similarity calculating apparatus 30, using the random numbers used by the concealment apparatus 10.

The information matching system achieves concealment of the matching information by a linear conversion using the random numbers. Here, the linear conversion is a process a load on which is lower than that of an additive homomorphic encryption. For this reason, the information matching system can achieve the matching of information securely using the biometric information with a cost less than that of the case using an additive homomorphic public key cryptosystem.

Hereinafter, specific example embodiments are described in more detail with reference to the drawings.

First Example Embodiment

A first example embodiment will be described in further detail with reference to the drawings.
[Description of Configuration]

Figure 2:
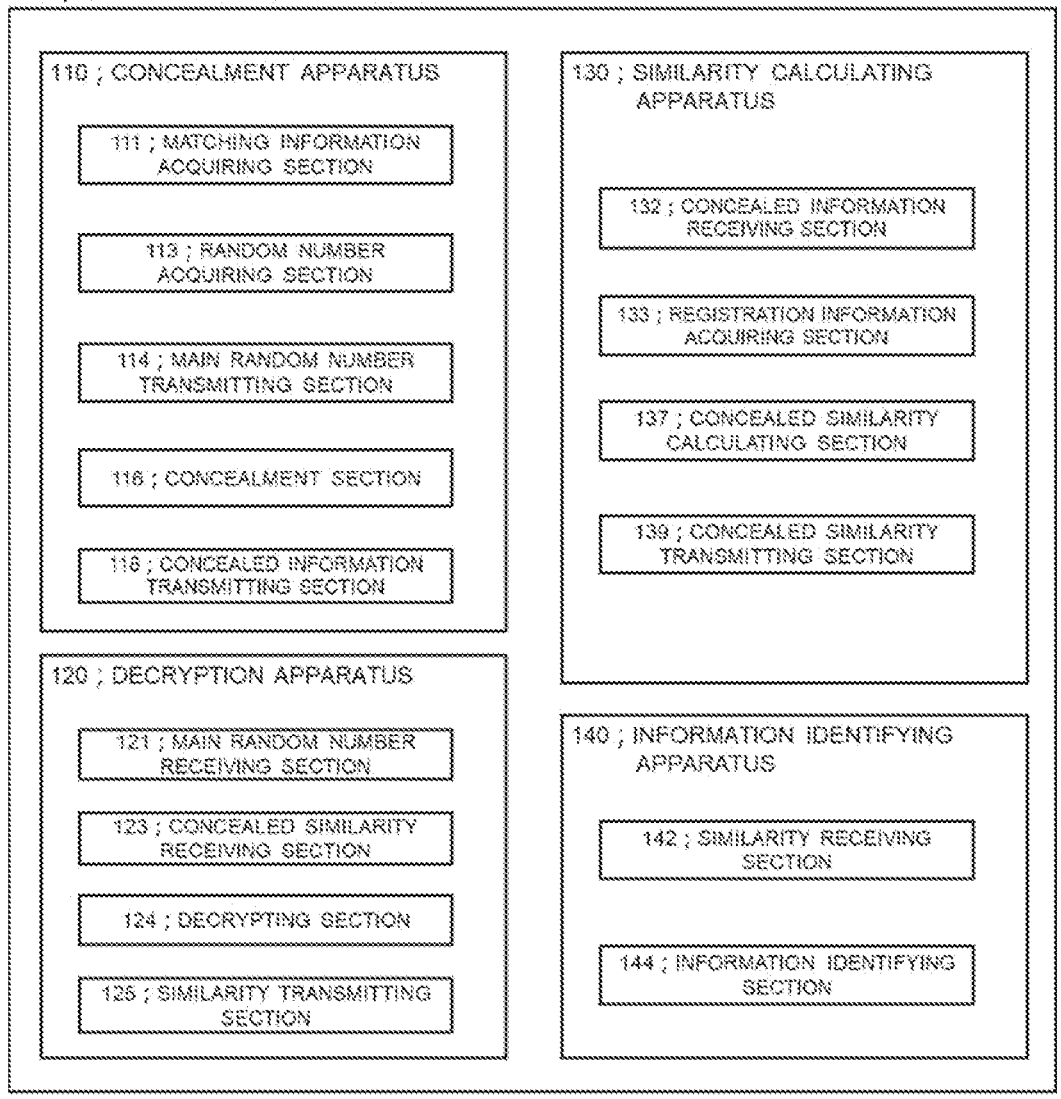
FIG. 2 is a block diagram illustrating a configuration of an information matching system (homomorphic encryption system) according to a first example embodiment.

FIG. 2 is a block diagram illustrating a configuration of an information matching system 100 according to the first example embodiment. The information matching system 100 includes a concealment apparatus 110, a decryption apparatus 120, a similarity calculating apparatus 130, and an information identifying apparatus 140. However, the apparatuses included in the information matching system 100 may be configured as separate apparatuses, or may be adequately mounted on an identical apparatus depending on a usage. For example, the information matching system 100 can be realized as a client-server system by separately mounting the concealment apparatus 110 and the decryption apparatus 120 on a client, and the similarity calculating apparatus 130 and the information identifying apparatus 140 on a server.

The apparatuses illustrated in FIG. 2 (the concealment apparatus 110, the decryption apparatus 120, the similarity calculating apparatus 130, and the information identifying apparatus 140) are connected in a wired or wireless manner and configured to be communicable with each other.

The concealment apparatus 110 includes
a matching information acquiring section 111 that acquires matching information,
a random number acquiring section 113 that acquires random numbers,
a main random number transmitting section 114 that transmits main random numbers included in the random numbers acquired by the random number acquiring section 113,
a matching information concealment section 116 that conceals the matching information acquired by the matching information acquiring section 111 using the random numbers acquired by the random number acquiring section 113, and
a concealed information transmitting section 118 that transmits the concealed information generated by the matching information concealment section 116.

The decryption apparatus 120 includes
a main random number receiving section 121 that receives the main random numbers,
a concealed similarity receiving section 123 that receives the concealed similarity,
a decrypting section 124 that calculates a similarity from the main random numbers acquired by the main random number receiving section 121 and the concealed similarity received by the concealed similarity receiving section 123, and
a similarity transmitting section 125 that transmits the similarity calculated by the decrypting section 124.

The similarity calculating apparatus 130 includes
a concealed information receiving section 132 that receives the concealed information,
a registration information acquiring section 133 that acquires registration information,
a concealed similarity calculating section 137 that calculates a concealed similarity from the concealed information received by the concealed information receiving section 132 and the registration information received by the registration information acquiring section 133, and
a concealed similarity transmitting section 139 that transmits the concealed similarity calculated by the concealed similarity calculating section 137.

The information identifying apparatus 140 includes
a similarity receiving section 142 that receives the similarity, and
an information identifying section 144 that identifies information using the similarity received by the similarity receiving section 142.
[Description of Operation]

Figure 3:
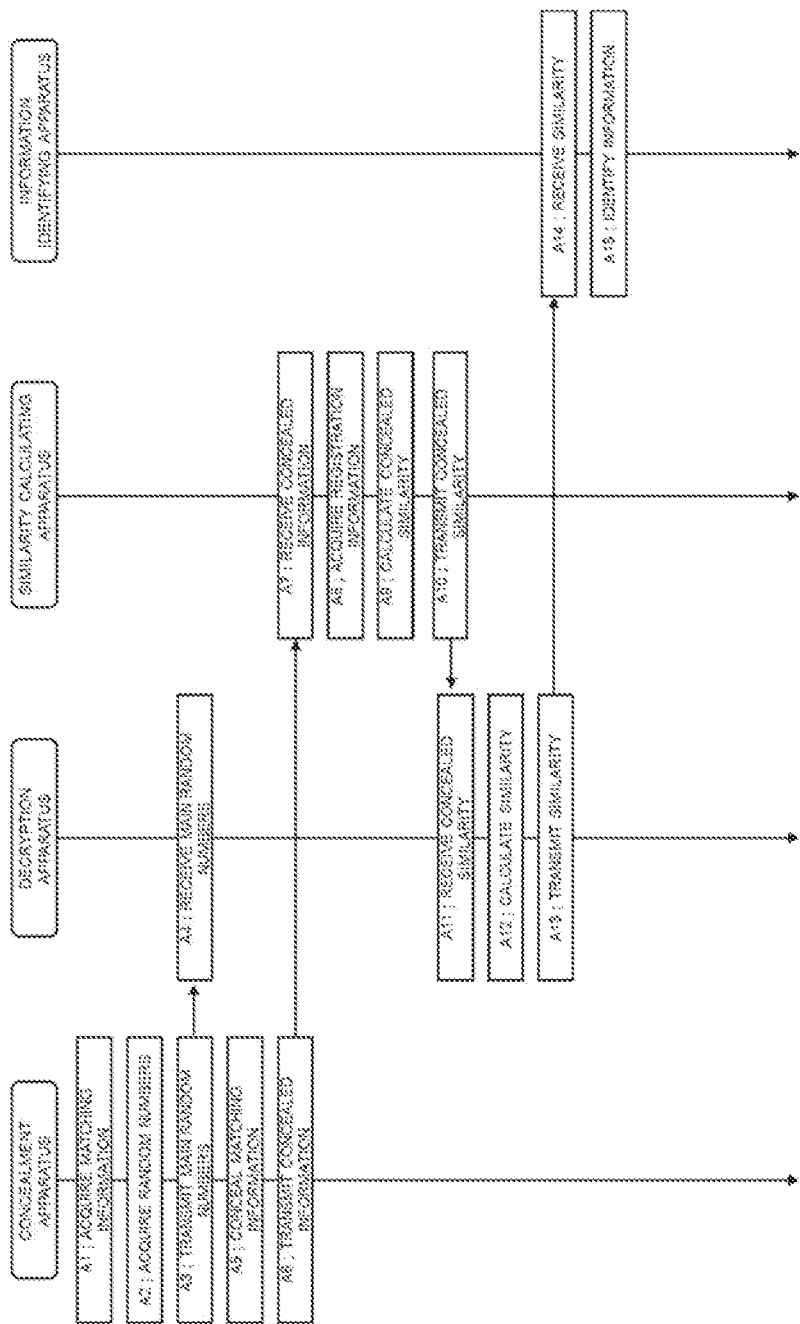
FIG. 3 is a flow diagram illustrating an operation of the information matching system according to the first example embodiment.

Next, with reference to FIG. 3, an entire operation of the information matching system 100 according to the present example embodiment will be described.

First, the matching information acquiring section 111 in the concealment apparatus 110 acquires matching information (step A1). Note that the matching information may be acquired in any way. For example, the matching information may be generated using a matching information acquiring function that the concealment apparatus 110 has therein, or may be acquired from outside of the concealment apparatus 110.

Next, the random number acquiring section 113 acquires random numbers (step A2). Note that the random numbers may be acquired in any way. For example, the random numbers may be generated using a random number generating function that the concealment apparatus 110 has therein, or random numbers generated outside the concealment apparatus 110 may be acquired from an external apparatus.

Next, the random number transmitting section 114 transmits main random numbers among the random numbers generated in step A2 to the decryption apparatus 120 (step A3).

Next, the main random number receiving section 121 in the decryption apparatus 120 receives the main random numbers from the concealment apparatus 110 (step A4).

Next, the matching information concealment section 116 conceals the matching information acquired in step A1 by a linear conversion using the random numbers acquired in step A2 to generate concealed information (step A5).

Next, the concealed information transmitting section 118 transmits the concealed information generated in step A5 to the similarity calculating apparatus 130 (step A6).

Next, the concealed information receiving section 132 in the similarity calculating apparatus 130 receives the concealed information from the concealment apparatus 110 (step A7).

Next, the registration information acquiring section 133 acquires registration information (step A8). The registration information may be stored anywhere. For example, a database storing the registration information may be included in the similarity calculating apparatus 130, or the registration information may be stored in an external apparatus connected with the similarity calculating apparatus 130. The registration information may include a plurality of pieces of information. In a case that a plurality of pieces of information are included, each piece of registration information is assigned with a specific identifier.

Next, the concealed similarity calculating section 137 calculates a concealed similarity from the concealed information received in step A7 and the registration information acquired in step A8 (step A9).

Note that the concealed similarity is a concealed form of the similarity between the matching information and the registration information. In the case that the registration information includes a plurality of pieces of information, the number of the calculated concealed similarities is the same as the number of the plurality of pieces of information. Each concealed similarity is assigned with a specific identifier, and which registration information the concealed similarity corresponds to can be identified by the identifier. Note that the identifier assigned to each concealed similarity may be the same as the identifier assigned to each piece of registration information.

Next, the concealed similarity transmitting section 139 transmits the concealed similarity calculated in step A9 to the decryption apparatus 120 (step A10).

Next, the concealed similarity receiving section 123 in the decryption apparatus 120 receives the concealed similarity from the similarity calculating apparatus 130 (step A11).

Next, the decrypting section 124 calculates a similarity from the main random numbers received in step A4 and the concealed similarity received in step A11 (step A12).

Note that the similarity is a similarity between the matching information and the registration information. In the case that the registration information includes a plurality of pieces of information, the number of the calculated similarities is the same as the number of the plurality of pieces of information. Each similarity is assigned with a specific identifier, and which registration information the similarity corresponds to can be identified by the identifier. Note that the identifier assigned to each similarity may be the same as the identifier assigned to each piece of registration information.

Next, the similarity transmitting section 125 transmits the similarity calculated in step A12 to the information identifying apparatus 140 (step A13).

Next, the similarity receiving section 142 in the information identifying apparatus 140 receives the similarity from the decryption apparatus 120 (step A14).

Finally, the information identifying section 144 identifies, among the similarities received in step A14, a similarity falling within a predefined acceptable range to identify registration information that is recognized to be sufficiently similar to the matching information (step A15).

Note that in a case that it is not necessary to identify the registration information recognized to be sufficiently similar to the matching information, but it is desired to check whether the registration information recognized to be sufficiently similar to the matching information is present or not, such processing may be made.

Concrete Example 1 According to First Example Embodiment

Next, a concrete example 1 of the operation of the information matching system 100 according to the present example embodiment will be described.

In this concrete example, a case that a group on elliptic curve is used will be described. Assume that a group with an order of a κ-bit prime number q on an elliptic curve E and a generator G of the group are published.

In this concrete example, a case that vectors (with a dimension number of D) are used for the matching information and the registration information will be described. Furthermore, a case that the similarity between the matching information and the registration information is calculated by use of the inner product of the two vectors will be described. Assume a case that the matching information and the registration information are determined to be sufficiently similar to each other is a case that the similarity calculated by use of the inner product of the matching information and the registration information matches any one of T values $\theta_1, \ldots,$ and $\theta_\tau$.

In this concrete example, assume that pieces of information of N persons are registered in the database, and the pieces of the registration information of N persons are assigned with the identifiers of 1 to N.

However, a target of the present example embodiment is not limited to such cases above.

First, the matching information acquiring section 111 in the concealment apparatus 110 acquires, as the matching information, a D-dimensional vector:

$$x = (x_1, \ldots, \text{and } x_D)$$

(step A1).

Next, the main random number acquiring section 113 acquires, as the random numbers, D+2 κ-bit random numbers a, b, $s_1, \ldots,$ and $s_D$ (step A2). Hereinafter, among the acquired random numbers, a and b are collectedly referred to as main random numbers. D random numbers $s_1, \ldots,$ and $s_D$ are expressed as a vector:

$$s = (s_1, \ldots, \text{and } s_D).$$

Next, the main random number transmitting section 114 transmits the main random numbers (a, b) generated in step A2 to the decryption apparatus 120 (step A3).

Next, the main random number receiving section 121 in the decryption apparatus 120 receives the main random numbers (a, b) from the concealment apparatus 110 (step A4).

Next, the matching information concealment section 116 in the concealment apparatus 110 calculates, $$S_j = [s_j]G \text{ and } z_j = ax_j - bs_j$$

for all j=1, . . . , and D,
from the matching information $x = (x_1, \ldots,$ and $x_D)$ acquired in step A1 and
the random numbers a, b, $s = (s_1, \ldots,$ and $s_D)$ acquired in step A2.

Among the calculated values, D values $z_1, \ldots,$ and $z_D$ are expressed as a vector:

$$z = (z_1, \ldots, \text{and } z_D).$$

The matching information concealment section 116 combines the calculated values to obtain the concealed information $((S_1, \ldots,$ and $S_D), z)$ (step A5).

Next, the concealed information transmitting section 118 transmits the concealed information $((S_1, \ldots,$ and $S_D), z)$ generated in step A5 to the similarity calculating apparatus 130 (step A6).

Next, the concealed information receiving section 132 in the similarity calculating apparatus 130 receives the concealed information $((S_1, \ldots,$ and $S_D), z)$ from the concealment apparatus 110 (step A7).

Next, the registration information acquiring section 133 acquires, as the registration information, N D-dimensional vectors $y_1, \ldots,$ and $y_N$ (where $y_{i,1}, \ldots,$ and $y_{i,D}$) for all i=1, . . . , and N) (step A8).

Next, the concealed similarity calculating section 137 calculates, as concealed similarities for all i=1, . . . , and N, $$U_i=[y_{i,1}]S_1+ \ldots +[y_{i,D}]S_D \text{ and}$$

$$W_i=[<z,y_i>]G$$

from the concealed information ((S$_1$, . . . , and S$_D$), z) received in step A7 and the registration information y$_1$, . . . , and y$_N$ (where y$_i$=1, . . . , and y$_{i,\ D}$) for all i=1, . . . , and N) acquired in step A8 (step A9).
Note that because S$_j$=[s$_j$]G and z$_j$=ax$_j$−bs$_j$ are satisfied for all j=1, . . . , and D, U$_i$ and W$_i$ for all i=1, . . . , and N are also be expressed as $$U_i=[<s,y_i>]G$$

and $$W_i=[a<x,y_i>-b<s,y_i>]G.$$

Next, the concealed similarity transmitting section 139 transmits the concealed similarities (U$_1$, . . . , and U$_N$, W$_1$, . . . , and W$_N$) calculated in step A9 to the decryption apparatus 120 (step A10).

Next, the concealed similarity receiving section 123 in the decryption apparatus 120 receives the concealed similarities (U$_1$, . . . , and U$_N$, W$_1$, . . . , and W$_N$) from the similarity calculating apparatus 130 (step A11).

Next, the decrypting section 124 calculates, as points of similarities for all i=1, . . . , and N, $$[<x,y_i>]G$$

from the main random numbers a and b received in step A4 and
the concealed similarities (U$_1$, . . . , and U$_N$, W$_1$, . . . , and W$_N$) received in step A11 (step A12).
Note that the point of similarity for all i=1, . . . , and N can be calculated as, for example, [a$^{-1}$]([b]U$_i$+W$_i$).

Next, the similarity transmitting section 125 transmits the points of similarities ([<x, y$_1$>]G, . . . , and [<x, y$_N$>]G) calculated in step A12 to the information identifying apparatus 140 (step A13).

Next, the similarity receiving section 142 in the information identifying apparatus 140 receives the points of similarities ([<x, y$_1$>]G, . . . , and [<x, y$_N$>]G) from the decryption apparatus 120 (step A14).

At the end of the main calculation process, the information identifying section 144 identifies, among the points of similarities ([<x, y$_1$>]G, . . . , and [<x, y$_N$>]G) received in step A14, a point of similarity falling within a point acceptable range ([θ$_1$]G, . . . , and [θ$_τ$]G) corresponding to a predefined acceptable range (θ$_1$, . . . , and θ$_τ$) (step A15).

Note that in this concrete example, although the points of similarities are calculated in step A12 and the information is identified from the points of similarities in step A15, a similarity may be further calculated from the points of similarities in step A12, or a similarity falling within the acceptable range may be further identified in step A12, and an identifier associated with the similarity identified may be transmitted in step A13.

This concrete example describes the example in which the similarity calculating apparatus 130 orders N concealed similarities to be transmitted to the decryption apparatus 120 in an index-based order of the registration information and transmits the resultant concealed similarities in step A10, but the similarity calculating apparatus 130 may assign a new identifier to each of the concealed similarities, shuffle the concealed similarities, and transmit the resultant concealed similarities to the decryption apparatus 120. At this time, the similarity calculating apparatus 130 may further give correspondences of two types of identifiers to the information identifying apparatus 140 so that the information identifying apparatus 140 can determine an identifier of the registration information that the information identifying apparatus 140 desires to identify.

Concrete Example 2 According to First Example Embodiment

Next, a concrete example 2 of the operation of the information matching system 100 according to the present example embodiment will be described.

In this concrete example also, although a description is given assuming a case similar to the case of the concrete example 1 according to the first example embodiment, a target of the present example embodiment is not limited to these cases.

First, the matching information acquiring section 111 in the concealment apparatus 110 acquires, as the matching information, a D-dimensional vector:

$$x=(x_1, \ldots, \text{and } x_D)$$

(step A1).

Next, the main random number acquiring section 113 acquires 2D+1 κ-bit random numbers b, s$_1$, . . . , and s$_D$, t$_1$, . . . , and t$_D$ (step A2). Hereinafter, among the acquired random numbers, b is referred to as a main random number. D random numbers s$_1$, . . . , and s$_D$ and D random numbers t$_1$, . . . , and t$_D$ are expressed as vectors:

$$s=(s_1, \ldots, \text{and } s_D) \text{ and } t=(t_1, \ldots, \text{and } t_D).$$

Next, the main random number transmitting section 114 transmits the main random number b generated in step A2 to the decryption apparatus 120 (step A3).

Next, the main random number receiving section 121 in the decryption apparatus 120 receives the main random number b from the concealment apparatus 110 (step A4).

Next, the matching information concealment section 116 in the concealment apparatus 110 calculates, $$S_j=[s_j]G, T_j=[t_j]G, \text{ and } z_j=-bs_j-t_j$$

for all j=1, . . . , and D,
from the matching information x=(x$_1$, . . . , and x$_D$) acquired in step A1 and
b, s=(s$_1$, . . . , and s$_D$), and t=(t$_1$, . . . , and t$_D$) acquired in step A2.
Among the calculated values, D values z$_1$, . . . , and z$_D$ are expressed as a vector:

$$z=(z_1, \ldots, \text{and } z_D).$$

The matching information concealment section 116 combines the calculated values to let ((S$_1$, . . . , and S$_D$), (T$_1$, . . . , and T$_D$), z) be the concealed information (step A5).

Next, the concealed information transmitting section 118 transmits the concealed information ((S$_1$, . . . , and S$_D$), (T$_1$, . . . , and T$_D$), z) generated in step A5 to the similarity calculating apparatus 130 (step A6).

Next, the concealed information receiving section 132 in the similarity calculating apparatus 130 receives the concealed information ((S$_1$, . . . , and S$_D$), (T$_1$, . . . , and T$_D$), z) from the concealment apparatus 110 (step A7).

Next, the registration information acquiring section 133 acquires, as the registration information, N D-dimensional vectors y$_1$, . . . , and y$_N$ (where y$_i$=(y$_{i,\ 1}$, . . . , and y$_{i,\ D}$) for all i=1, . . . , and N) (step A8).

Next, the concealed similarity calculating section 137 calculates, as concealed similarities for all i=1, . . . , and N, $$U_i = [y_{i,1}]S_1 + \ldots + [y_{i,D}]S_D \text{ and}$$

$$V_i = [y_{i,1}]T_1 + \ldots + [y_{i,D}]T_D + [<z, y_i>]G$$

from the concealed information ((S$_1$, . . . , and S$_D$), (T$_1$, . . . , and T$_D$), z) received in step A7 and
the registration information $y_1$, . . . , and $y_N$ (where $y_i$ = ($y_{i,1}$, . . . , and $y_{i,D}$) for all i=1, and N) acquired in step A8 (step A9).
Note that because $S_j = [s_j]G$, $T_j = [t_j]G$, and $z_j = x_j - bs_j - t_j$ are satisfied for all j=1, . . . , and D,
$U_i$ and $V_i$ for all i=1, . . . , and N are also be expressed as $$U_i = [<s, y_i>]G$$

and $$V_i = [<x, y_i> - b<s, y_i>]G.$$

Next, the concealed similarity transmitting section 139 transmits the concealed similarities (U$_1$, . . . , and U$_N$, V$_1$, . . . , and V$_N$) calculated in step A9 to the decryption apparatus 120 (step A10).

Next, the concealed similarity receiving section 123 in the decryption apparatus 120 receives the concealed similarities (U$_1$, . . . , and U$_N$, V$_1$, . . . , and V$_N$) from the similarity calculating apparatus 130 (step A11).

Next, the decrypting section 124 calculates, as points of similarities for all i=1, . . . , and N, $$[<x, y_i>]G$$

from the main random number b received in step A4 and the concealed similarities (U$_1$, . . . , and U$_N$, V$_1$, . . . , and V$_N$) received in step A11 (step A12).
Note that the point of similarity for all i=1, . . . , and N can be calculated as, for example, $[b]U_i + V_i + W_i$.

Next, the similarity transmitting section 125 transmits the points of similarities ([<x, y$_1$>]G, . . . , and [<x, y$_N$>]G) calculated in step A12 to the information identifying apparatus 140 (step A13).

Next, the similarity receiving section 142 in the information identifying apparatus 140 receives the points of similarities ([<x, y$_1$>]G, . . . , and [<x, y$_N$>]G) from the decryption apparatus 120 (step A14).

At the end of the main calculation process, the information identifying section 144 identifies, among the points of similarities ([<x, y$_1$>]G, . . . , and [<x, y$_N$>]G) received in step A14, a point of similarity falling within a point acceptable range ([θ$_1$]G, . . . , and [θ$_τ$]G) corresponding to a predefined acceptable range (θ$_1$, . . . , and θ$_τ$) (step A15).

Note that in this concrete example, although the points of similarities are calculated in step A12 and the information is identified from the points of similarities in step A15, a similarity may be further calculated from the points of similarities in step A12, or a similarity falling within the acceptable range may be further identified in step A12, and an identifier associated with the similarity identified may be transmitted in step A13.

This concrete example describes the example in which the similarity calculating apparatus 130 orders N concealed similarities to be transmitted to the decryption apparatus 120 in an index-based order of the registration information and transmits the resultant concealed similarities in step A10, but the similarity calculating apparatus 130 may assign a new identifier to each of the concealed similarities, shuffle the concealed similarities, and transmit the resultant concealed similarities to the decryption apparatus 120. At this time, the similarity calculating apparatus 130 may further give correspondences of two types of identifiers to the information identifying apparatus 140 so that the information identifying apparatus 140 can determine an identifier of the registration information that the information identifying apparatus 140 desires to identify.

[Description of Effect]

An effect of the present example embodiment described above is that information matching securely using the biometric information can be realized with a cost less than that of the case of using an additive homomorphic public key cryptosystem. This is because in the concealment of the matching information in step A5, the concealment is performed by the linear conversion instead of a homomorphic operation of an additive homomorphic public key cryptosystem. The linear conversion, rather than the general concealment, is applied to allow the concealed similarities and the similarities to be calculated in step A9 and step A12.

Second Example Embodiment

[Description of Configuration]

Figure 4:
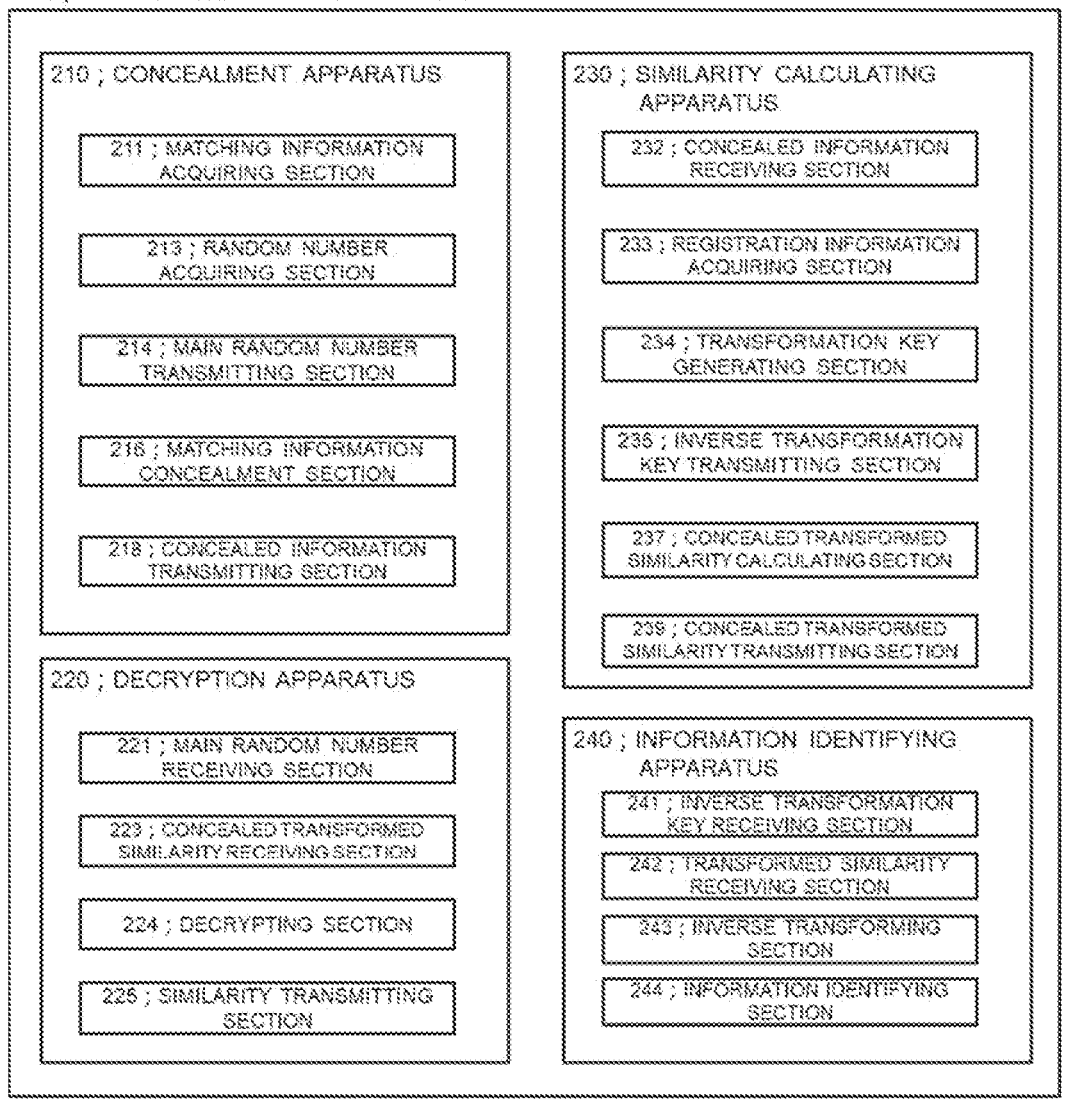
FIG. 4 is a block diagram illustrating a configuration of an information matching system according to a second example embodiment.

FIG. 4 is a block diagram illustrating a configuration of an information matching system 200 according to a second example embodiment. The information matching system 200 includes a concealment apparatus 210, a decryption apparatus 220, a similarity calculating apparatus 230, and an information identifying apparatus 240. However, the apparatuses included in the information matching system 200 may be configured as separate apparatuses, or may be adequately mounted on an identical apparatus as usage. For example, the information matching system 200 can be realized as a client-server system by separately mounting the concealment apparatus 210 and the decryption apparatus 220 on a client, and the similarity calculating apparatus 230 and the information identifying apparatus 240 on a server.

The apparatuses illustrated in FIG. 4 (the concealment apparatus 210, the decryption apparatus 220, the similarity calculating apparatus 230, and the information identifying apparatus 240) are connected in a wired or wireless manner and configured to be communicable with each other.

The concealment apparatus 210 includes
a matching information acquiring section 211 that acquires matching information,
a random number acquiring section 213 that acquires random numbers,
a main random number transmitting section 214 that transmits main random numbers included in the random numbers acquired by the random number acquiring section 213,
a matching information concealment section 216 that conceals the matching information acquired by the matching information acquiring section 211 using the random numbers acquired by the random number acquiring section 213, and
a concealed information transmitting section 218 that transmits the concealed information generated by the matching information concealment section 216.

The decryption apparatus 220 includes
a main random number receiving section 221 that receives the main random numbers,
a concealed transformed similarity receiving section 223 that receives the concealed transformed similarity,
a decrypting section 224 that calculates a transformed similarity from the main random numbers received by the main random number receiving section 221 and the concealed transformed similarity received by the concealed transformed similarity receiving section 223, and a similarity transmitting section 225 that transmits the transformed similarity calculated by the decrypting section 224.

The similarity calculating apparatus 230 includes
a concealed information receiving section 232 that receives the concealed information,
a registration information acquiring section 233 that acquires registration information,
a transformation key generating section 234 that generates a transformation key and an inverse transformation key,
an inverse transformation key transmitting section 235 that transmits the inverse transformation key generated by the transformation key generating section 234,
a concealed transformed similarity calculating section 237 that calculates a concealed transformed similarity from the concealed information received by the concealed information receiving section 232, the registration information received by the registration information acquiring section 233, and the transformation key generated by the transformation key generating section 234, and
a concealed transformed similarity transmitting section 239 that transmits the concealed transformed similarity calculated by the concealed transformed similarity calculating section 237.

The information identifying apparatus 240 includes
an inverse transformation key receiving section 241 that receives an inverse transformation key,
a transformed similarity receiving section 242 that receives the transformed similarity, an inverse transforming section 243 that inversely transforms the transformed similarity received by the transformed similarity receiving section 242 using the inverse transformation key generated by the transformation key generating section 234, and
an information identifying section 244 that identifies information using the similarity calculated by the inverse transforming section 243.

[Description of Operation]

Figure 5:
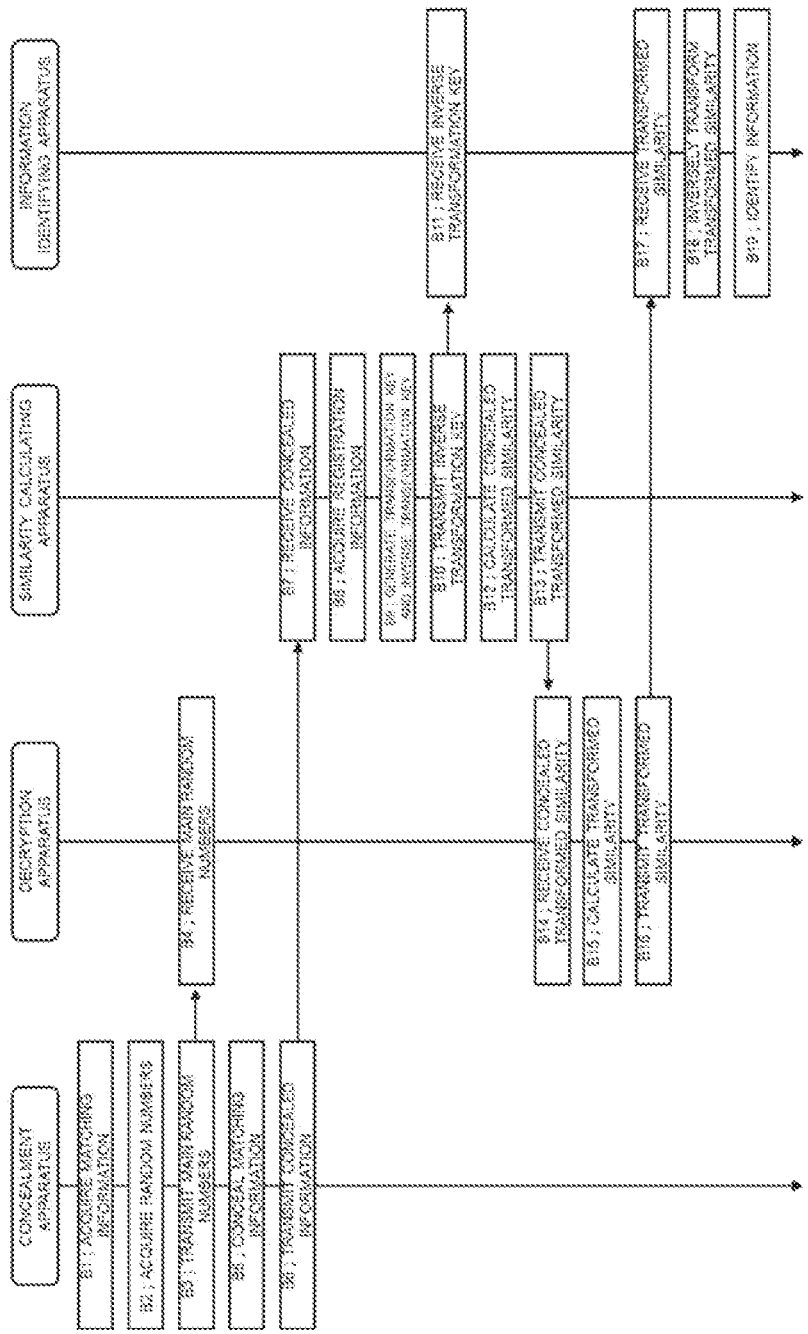
FIG. 5 is a flow diagram illustrating an operation of the information matching system according to the second example embodiment.

Next, with reference to FIG. 5, an entire operation of the information matching system 200 according to the present example embodiment will be described.

First, the matching information acquiring section 211 in the concealment apparatus 210 acquires matching information (step B1). Note that the matching information may be acquired in any way. For example, the matching information may be generated using a matching information acquiring function that the concealment apparatus 210 has therein, or may be acquired from outside of the concealment apparatus 210.

Next, the random number acquiring section 213 acquires random numbers (step B2). Note that the random numbers may be acquired in any way. For example, the random numbers may be generated using a random number generating function that the concealment apparatus 210 has therein, or random numbers generated outside the concealment apparatus 210 may be acquired from an external apparatus.

Next, the random number transmitting section 214 transmits main random numbers among the random numbers generated in step B2 to the decryption apparatus 220 (step B3).

Next, the main random number receiving section 221 in the decryption apparatus 220 receives the main random numbers from the concealment apparatus 210 (step B4).

Next, the matching information concealment section 216 in the concealment apparatus 210 conceals the matching information acquired in step B1 by a linear conversion using the random numbers acquired in step B2 to generate concealed information (step B5).

Next, the concealed information transmitting section 218 transmits the concealed information generated in step B5 to the similarity calculating apparatus 230 (step B6).

Next, the concealed information receiving section 232 in the similarity calculating apparatus 230 receives the concealed information from the concealment apparatus 210 (step B7).

Next, the registration information acquiring section 233 acquires registration information (step B8). The registration information may be stored anywhere. For example, a database storing the registration information may be included in the similarity calculating apparatus 230, or the registration information may be stored in an external apparatus connected with the similarity calculating apparatus 230. The registration information may include a plurality of pieces of information. In a case that a plurality of pieces of information are included, each piece of registration information is assigned with a specific identifier.

Next, the transformation key generating section 234 acquires the random numbers to generate a transformation key and an inverse transformation key based on the random number (step B9). Note that the random numbers may be acquired in any way. For example, the random numbers may be generated using a random number generating function that the similarity calculating apparatus 230 has therein, or random numbers generated outside the similarity calculating apparatus 230 may be acquired from an external apparatus.

Next, the inverse transformation key transmitting section 235 transmits the inverse transformation key generated in step B9 to the information identifying apparatus 240 (step B10).

Next, the inverse transformation key receiving section 241 in the information identifying apparatus 240 receives the inverse transformation key from the similarity calculating apparatus 230 (step B11).

Next, the concealed transformed similarity calculating section 237 in the similarity calculating apparatus 230 calculates a concealed transformed similarity from the concealed information received in step B7, the registration information acquired in step B8, and the transformation key generated in step B9 (step B12).

Note that the concealed transformed similarity is a concealed form of a value which is a transformed form of the similarity between the matching information and the registration information using the transformation key. In the case that the registration information includes a plurality of pieces of information, the number of the calculated concealed transformed similarities is the same as the number of the plurality of pieces of information. Each concealed transformed similarity is assigned with a specific identifier, and which registration information the concealed transformed similarity corresponds to can be identified by the identifier. Note that the identifier assigned to each concealed transformed similarity may be the same as the identifier assigned to each piece of registration information.

Next, the concealed transformed similarity transmitting section 239 transmits the concealed transformed similarity calculated in step B12 to the decryption apparatus 220 (step B13).

Next, the concealed transformed similarity receiving section 223 in the decryption apparatus 220 receives the concealed transformed similarity from the similarity calculating apparatus 230 (step B14).

Next, the decrypting section 224 calculates a transformed similarity from the main random numbers received in step B4 and the concealed transformed similarity received in step B14 (step B15).

Note that the transformed similarity is a transformed form of the similarity between the matching information and the registration information using the transformation key. In the case that the registration information includes a plurality of pieces of information, the number of the calculated transformed similarities is the same as the number of the plurality of pieces of information. Each transformed similarity is assigned with a specific identifier, and which registration information the transformed similarity corresponds to can be identified by the identifier. Note that the identifier assigned to each transformed similarity may be the same as the identifier assigned to each piece of registration information.

Next, the similarity transmitting section 225 transmits the transformed similarity calculated in step B15 to the information identifying apparatus 240 (step B16).

Next, the transformed similarity receiving section 242 in the information identifying apparatus 240 receives the transformed similarity from the decryption apparatus 220 (step B17).

Next, the inverse transforming section 243 inversely transforms the transformed similarity received in step B17 using the inverse transformation key received in step B11 to calculate a similarity (step B18).

Note that the similarity is a similarity between the matching information and the registration information. In the case that the registration information includes a plurality of pieces of information, the number of the calculated similarities is the same as the number of the plurality of pieces of information. Each similarity is assigned with a specific identifier, and which registration information the similarity corresponds to can be identified by the identifier. Note that the identifier assigned to each similarity may be the same as the identifier assigned to each piece of registration information.

Finally, the information identifying section 244 identifies, among the similarities calculated in step B18, a similarity falling within a predefined acceptable range to identify registration information that is recognized to be sufficiently similar to the matching information (step B19).

Note that in a case that it is not necessary to identify the registration information recognized to be sufficiently similar to the matching information, but it is desired to check whether the registration information recognized to be sufficiently similar to the matching information is present or not, such processing may be made.

Concrete Example 1 According to Second Example Embodiment

Next, a concrete example 1 of the operation of the information matching system 200 according to the present example embodiment will be described.

In this concrete example, a case that a group on elliptic curve is used will be described. Assume that a group with an order of a κ-bit prime number q on an elliptic curve E and a generator G of the group are published.

In this concrete example, a case that vectors (with a dimension number of D) are used for the matching information and the registration information will be described. Furthermore, a case that the similarity between the matching information and the registration information is calculated by use of the inner product of the two vectors will be described. Assume a case that the matching information and the registration information are determined to be sufficiently similar to each other is a case that the similarity calculated by use of the inner product of the matching information and the registration information matches any one of T values $\theta_1, \ldots,$ and $\theta_\tau$.

In this concrete example, assume that pieces of information of N persons are registered in the database, and the pieces of the registration information of N persons are assigned with the identifiers of 1 to N. However, a target of the present example embodiment is not limited to such cases above.

First, the matching information acquiring section 211 in the concealment apparatus 210 acquires, as the matching information, a D-dimensional vector:

$$x = (x_1, \ldots, \text{and } x_D)$$

(step B1).

Next, the main random number acquiring section 213 acquires, as the random numbers, D+2 κ-bit random numbers $a, b, s_1, \ldots,$ and $s_D$ (step B2). Hereinafter, among the acquired random numbers, a and b are collectedly referred to as main random numbers. D random numbers $s_1, \ldots,$ and $s_D$ are expressed as a vector:

$$s = (s_1, \ldots, \text{and } s_D).$$

Next, the main random number transmitting section 214 transmits the main random numbers (a, b) generated in step B2 to the decryption apparatus 220 (step B3).

Next, the main random number receiving section 221 in the decryption apparatus 220 receives the main random numbers (a, b) from the concealment apparatus 210 (step B4).

Next, the matching information concealment section 216 in the concealment apparatus 210 calculates, $$S_j = [s_j]G \text{ and } z_j = ax_j - bs_j$$

for all $j = 1, \ldots,$ and D,
from the matching information $x = (x_1, \ldots,$ and $x_D)$ acquired in step B1 and
the random numbers a, b, and $s = (s_1, \ldots,$ and $s_D)$ acquired in step B2.
Among the calculated values, D values $z_1, \ldots,$ and $z_D$ are expressed as a vector:

$$z = (z_1, \ldots, \text{and } z_D).$$

The matching information concealment section 216 combines the calculated values to let $((S_1, \ldots, \text{and } S_D), z)$ be the concealed information (step B5).

Next, the concealed information transmitting section 218 transmits the concealed information $((S_1, \ldots, \text{and } S_D), z)$ generated in step B5 to the similarity calculating apparatus 230 (step B6).

Next, the concealed information receiving section 232 in the similarity calculating apparatus 230 receives the concealed information $((S_1, \ldots, \text{and } S_D), z)$ from the concealment apparatus 210 (step B7).

Next, the registration information acquiring section 233 acquires, as the registration information, N D-dimensional vectors $y_1, \ldots,$ and $y_N$ (where $y_i = (y_{i,1}, \ldots, \text{and } y_{i,D})$ for all $i = 1, \ldots,$ and N) (step B8).

Next, the transformation key generating section 234 acquires D κ-bit random numbers $r_1, \ldots,$ and $r_N$ to let $(r_1, \ldots, \text{and } r_N)$ be the transformation keys and $((r_1)^{-1}, \ldots, \text{and } (r_N)^{-1})$ be the inverse transformation keys (step B9).

Next, the inverse transformation key transmitting section 235 transmits the inverse transformation keys $((r_1)^{-1}, \ldots,$ and $(r_N)^{-1}$) generated in step B9 to the information identifying apparatus 240 (step B10).

Next, the inverse transformation key receiving section 241 in the information identifying apparatus 240 receives the inverse transformation keys $((r_1)^{-1}, \ldots, \text{and } (r_N)^{-1})$ from the similarity calculating apparatus 230 (step B11).

Next, the concealed transformed similarity calculating section 237 calculates, as concealed transformed similarities for all $i=1, \ldots,$ and N, $$U_i = [r_i]([y_{i,1}]S_1 + \ldots + [y_{i,D}]S_D) \text{ and}$$

$$W_i = [r_i \langle z, y_i \rangle]G$$

from the concealed information $((S_1, \ldots, \text{and } S_D), z)$ received in step B7,
the registration information $y_1, \ldots,$ and $y_N$ (where $y_i = (y_{i,1}, \ldots, \text{and } y_{i,D})$ for all $i=1, \ldots,$ and N) acquired in step B8, and
the transformation keys $(r_1, \ldots, \text{and } r_N)$ generated in step B9 (step B12).
Note that because $S_j = [s_j]G$ and $z_j = ax_j - bs_j$ are satisfied for all $j=1, \ldots,$ and D,
$U_i$ and $W_i$ for all $i=1, \ldots,$ and N are also be expressed as $$U_i = [r_i \langle s, y_i \rangle]G$$

and $$W_i = [r_i(a \langle x, y_i \rangle - b \langle s, y_i \rangle)]G.$$

Next, the concealed transformed similarity transmitting section 239 transmits the concealed transformed similarities $(U_1, \ldots, \text{and } U_N, W_1, \ldots, \text{and } W_N)$ calculated in step B12 to the decryption apparatus 220 (step B13).

Next, the concealed transformed similarity receiving section 223 in the decryption apparatus 220 receives the concealed transformed similarities $(U_1, \ldots, \text{and } U_N, W_1, \ldots, \text{and } W_N)$ from the similarity calculating apparatus 230 (step B14).

Next, the decrypting section 224 calculates, as transformed similarities for all $i=1, \ldots,$ and N, $$A_i = [r_i \langle x, y_i \rangle]G$$

from the main random numbers a and b received in step B4 and
the concealed transformed similarities $(U_1, \ldots, \text{and } U_N, W_1, \ldots, \text{and } W_N)$ received in step B14 (step B15).
Note that the transformed similarity for all $i=1, \ldots,$ and N can be calculated as, for example, $$[a^{-1}]([b]U_i + W_i).$$

Next, the similarity transmitting section 225 transmits the transformed similarities $(A_1, \ldots, \text{and } A_N)$ calculated in step B15 to the information identifying apparatus 240 (step B16).

Next, the transformed similarity receiving section 242 in the information identifying apparatus 240 receives the transformed similarities $(A_1, \ldots, \text{and } A_N)$ from the decryption apparatus 220 (step B17).

Next, the inverse transforming section 243 calculates, as points of similarities for all $i=1, \ldots,$ and N, $$[\langle x, y_i \rangle]G$$

from the inverse transformation keys $((r_1)^{-1}, \ldots, \text{and } (r_N)^{-1})$ received in step B11 and the transformed similarities $(A_1, \ldots, \text{and } A_N)$ received in step B17 (step B18).
Note that the point of similarity for all $i=1, \ldots,$ and N can be calculated as, for example, $$[(r_i)^{-1}](A_i).$$

At the end of the main calculation process, the information identifying section 244 identifies, among the points of similarities $([\langle x, y_1 \rangle]G, \ldots, \text{and } [\langle x, y_N \rangle]G)$ calculated in step B18, a point of similarity falling within a point acceptable range $([\theta_1]G, \ldots, \text{and } [\theta_\tau]G)$ corresponding to a predefined acceptable range $(\theta_1, \ldots, \text{and } \theta_\tau)$ (step B19).

This concrete example describes the example in which the similarity calculating apparatus 230 orders N concealed similarities to be transmitted to the decryption apparatus 220 in an index-based order of the registration information and transmits the resultant concealed similarities in step B13, but the similarity calculating apparatus 230 may assign a new identifier to each of the concealed similarities, shuffle the concealed similarities, and transmit the resultant concealed similarities to the decryption apparatus 220. At this time, the similarity calculating apparatus 230 may further give correspondences of two types of identifiers to the information identifying apparatus 240 so that the information identifying apparatus 240 can determine an identifier of the registration information that the information identifying apparatus 240 desires to identify.

Concrete Example 2 According to Second Example Embodiment

Next, a concrete example 2 of the operation of the information matching system 200 according to the present example embodiment will be described.

In this concrete example also, although a description is given assuming a case similar to the case of the concrete example 1 according to the second example embodiment, a target of the present example embodiment is not limited to these cases.

First, the matching information acquiring section 211 in the concealment apparatus 210 acquires, as the matching information, a D-dimensional vector:

$$x = (x_1, \ldots, \text{and } x_D)$$

(step B1).

Next, the main random number acquiring section 213 acquires 2D+1 κ-bit random numbers $b, s_1, \ldots, \text{and } s_D, t_1, \ldots, \text{and } t_D$ (step B2). Hereinafter, among the acquired random numbers, b is referred to as a main random number. D random numbers $s_1, \ldots, \text{and } s_D$ and D random numbers $t_1, \ldots, \text{and } t_D$ are expressed as vectors:

$$s = (s_1, \ldots, \text{and } s_D) \text{ and } t = (t_1, \ldots, \text{and } t_D).$$

Next, the main random number transmitting section 214 transmits the main random number b generated in step B2 to the decryption apparatus 220 (step B3).

Next, the main random number receiving section 221 in the decryption apparatus 220 receives the main random number b from the concealment apparatus 210 (step B4).

Next, the matching information concealment section 216 in the concealment apparatus 210 calculates, $$S_j = [s_j]G, T_j = [t_j]G, z_j = x_j - bs_j - t_j$$

for all $j=1, \ldots,$ and D,
from the matching information $x = (x_1, \ldots, \text{and } x_D)$ acquired in step B1 and
random numbers $b, s = (s_1, \ldots, \text{and } s_D)$, and $t = (t_1, \ldots, \text{and } t_D)$ acquired in step B2.
Among the calculated values, D values $z_1, \ldots, \text{and } z_D$ are expressed as a vector:

$$z = (z_1, \ldots, \text{and } z_D).$$

The matching information concealment section 216 combines the calculated values to let $((S_1, \ldots, \text{and } S_D), (T_1, \ldots, \text{and } T_D), z)$ be the concealed information (step B5).

Next, the concealed information transmitting section 218 transmits the concealed information $((S_1, \ldots, \text{and } S_D), (T_1, \ldots, \text{and } T_D), z)$ generated in step B5 to the similarity calculating apparatus 230 (step B6).

Next, the concealed information receiving section 232 in the similarity calculating apparatus 230 receives the concealed information $((S_1, \ldots, \text{and } S_D), (T_1, \ldots, \text{and } T_D), z)$ from the concealment apparatus 210 (step B7).

Next, the registration information acquiring section 233 acquires, as the registration information, N D-dimensional vectors $y_1, \ldots,$ and $y_N$ (where $y_i = i, \ldots,$ and $y_{i,D}$) for all $i=1, \ldots,$ and N) (step B8).

Next, the transformation key generating section 234 acquires D κ-bit random numbers $r_1, \ldots,$ and $r_N$ to let $(r_1, \ldots,$ and $r_N)$ be the transformation keys and $((r_1)^{-1}, \ldots,$ and $(r_N)^{-1})$ be the inverse transformation keys (step B9).

Next, the inverse transformation key transmitting section 235 transmits the inverse transformation keys $((r_1)^{-1}, \ldots,$ and $(r_N)^{-1})$ generated in step B9 to the information identifying apparatus 240 (step B10).

Next, the inverse transformation key receiving section 241 in the information identifying apparatus 240 receives the inverse transformation keys $((r_1)^{-1}, \ldots,$ and $(r_N)^{-1})$ from the similarity calculating apparatus 230 (step B11).

Next, the concealed transformed similarity calculating section 237 calculates, as concealed transformed similarities for all $i=1, \ldots,$ and N, $$U_i = [r_i]([y_{i,1}]S_1 + \ldots + [y_{i,D}]S_D) \text{ and}$$

$$V_i = [r_i]([y_{i,1}]T_1 + \ldots + [y_{i,D}]T_D + [<z,y_i>]G)$$

from the concealed information $((S_1, \ldots,$ and $S_D), (T_1, \ldots,$ and $T_D), z)$ received in step B7, the registration information $y_1, \ldots,$ and $y_N$ (where $y_i = (y_{i,1}, \ldots,$ and $y_{i,D})$ for all $i=1,$ and N) acquired in step B8, and the transformation keys $(r_1, \ldots,$ and $r_N)$ generated in step B9 (step B12).

Note that because $S_j = [s_j]G$, $T_j = [t_j]G$, and $z_j = x_j - bs_j - t_j$ are satisfied for all $j=1, \ldots,$ and D, $U_i$ and $V_i$ for all $i=1, \ldots,$ and N are also be expressed as $$U_i = [r_i<s,y_i>]G$$

and $$V_i = [r_i(<x,y_i> - b<s,y_i>)]G.$$

Next, the concealed transformed similarity transmitting section 239 transmits the concealed transformed similarities $(U_1, \ldots,$ and $U_N, V_1, \ldots,$ and $V_N)$ calculated in step B12 to the decryption apparatus 220 (step B13).

Next, the concealed transformed similarity receiving section 223 in the decryption apparatus 220 receives the concealed transformed similarities $(U_1, \ldots,$ and $U_N, V_1, \ldots,$ and $V_N)$ from the similarity calculating apparatus 230 (step B14).

Next, the decrypting section 224 calculates, as transformed similarities for all $i=1, \ldots,$ and N, $$A_i = [r_i<x,y_i>]G$$

from the main random number b received in step B4 and the concealed transformed similarities $(U_1, \ldots,$ and $U_N, V_1, \ldots,$ and $V_N)$ received in step B14 (step B15).

Note that the transformed similarity for all $i=1, \ldots,$ and N can be calculated as, for example, $$[b]U_i + V_i.$$

Next, the similarity transmitting section 225 transmits the transformed similarities $(A_1, \ldots,$ and $A_N)$ calculated in step B15 to the information identifying apparatus 240 (step B16).

Next, the transformed similarity receiving section 242 in the information identifying apparatus 240 receives the transformed similarities $(A_1, \ldots,$ and $A_N)$ from the decryption apparatus 220 (step B17).

Next, the inverse transforming section 243 calculates, as points of similarities for all $i=1, \ldots,$ and N, $$[<x,y_i>]G$$

from the inverse transformation keys $((r_1)^{-1}, \ldots,$ and $(r_N)^{-1})$ received in step B11 and the transformed similarities $(A_1, \ldots,$ and $A_N)$ received in step B17 (step B18).

Note that the point of similarity for all $i=1, \ldots,$ and N can be calculated as, for example, $[(r_i)^{-1}](A_i)$.

At the end of the main calculation process, the information identifying section 244 identifies, among the points of similarities $([<x, y_1>]G, \ldots,$ and $[<x, y_N>]G)$ calculated in step B18, a point of similarity falling within a point acceptable range $([\theta_1]G, \ldots,$ and $[\theta\tau]G)$ corresponding to a predefined acceptable range $(\theta_1, \ldots,$ and $\theta_\tau)$ (step B19).

This concrete example describes the example in which the similarity calculating apparatus 230 orders N concealed similarities to be transmitted to the decryption apparatus 220 in an index-based order of the registration information and transmits the resultant concealed similarities in step B13, but the similarity calculating apparatus 230 may assign a new identifier to each of the concealed similarities, shuffle the concealed similarities, and transmit the resultant concealed similarities to the decryption apparatus 220. At this time, the similarity calculating apparatus 230 may further give correspondences of two types of identifiers to the information identifying apparatus 240 so that the information identifying apparatus 240 can determine an identifier of the registration information that the information identifying apparatus 240 desires to identify.

[Description of Effect]

An effect of the present example embodiment described above is, similar to the first example embodiment, that the information matching securely using the biometric information can be realized with the cost less than that of the case of using an additive homomorphic public key cryptosystem. This is because in the concealment of the matching information in step B5, the concealment is performed by the linear conversion instead of a homomorphic operation of an additive homomorphic public key cryptosystem. The linear conversion, rather than the general concealment, is applied to allow the concealed transformed similarities and the transformed similarities to be calculated in steps B12 and B15.

Furthermore, the present example embodiment has an effect that the present example embodiment can be executed without leaking the value of the similarity to the decryption apparatus 220, even in a case that the decryption apparatus 220 has information related to a random number other than the main random number, such as a case that the concealment apparatus 210 and the decryption apparatus 220 are mounted on the same apparatus. This is because the decryption apparatus 220 acquires the similarity that is transformed based on the transformation key generated by the similarity calculating apparatus 230.

Third Example Embodiment

[Description of Configuration]

Figure 6:
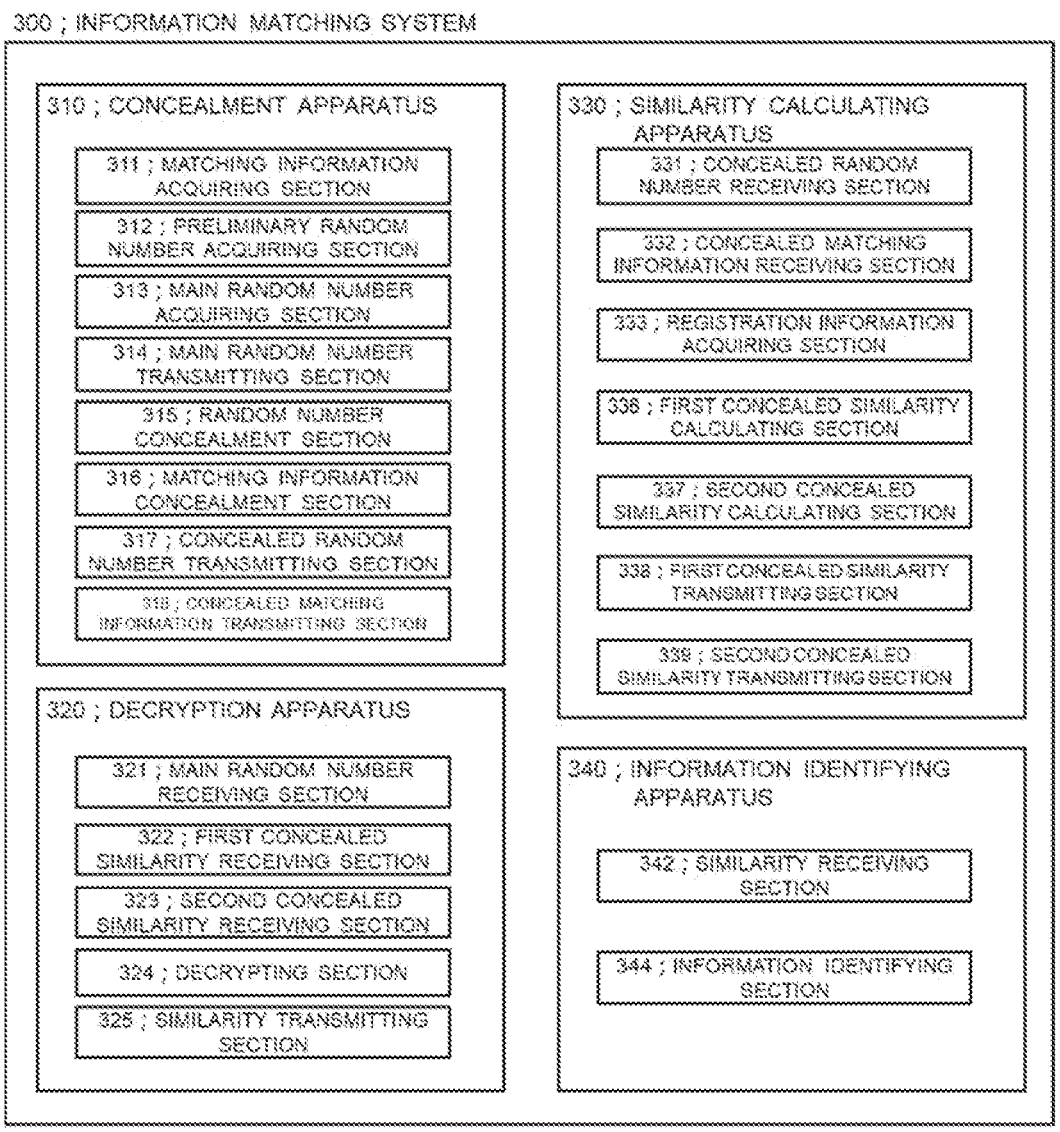
FIG. 6 is a block diagram illustrating a configuration of an information matching system according to a third example embodiment.

FIG. 6 is a block diagram illustrating a configuration of an information matching system 300 according to a third example embodiment. The information matching system 300 includes a concealment apparatus 310, a decryption apparatus 320, a similarity calculating apparatus 330, and an information identifying apparatus 340. However, the apparatuses included in the information matching system 300 may be configured as separate apparatuses, or may be adequately mounted on an identical apparatus as usage. For example, the information matching system 300 can be realized as a client-server system by separately mounting the concealment apparatus 310 and the decryption apparatus 320 on a client, and the similarity calculating apparatus 330 and the information identifying apparatus 340 on a server.

The apparatuses illustrated in FIG. 6 (the concealment apparatus 310, the decryption apparatus 320, the similarity calculating apparatus 330, and the information identifying apparatus 340) are connected in a wired or wireless manner and configured to be communicable with each other.

The concealment apparatus 310 includes a matching information acquiring section 311 that acquires matching information, a preliminary random number acquiring section 312 that acquires random numbers used for preliminary calculation, a main random number acquiring section 313 that acquires random numbers used for main calculation, a main random number transmitting section 314 that transmits the main random numbers acquired by the main random number acquiring section 313, a random number concealment section 315 that conceals the random numbers acquired by the preliminary random number acquiring section 312, a matching information concealment section 316 that conceals the matching information acquired by the matching information acquiring section 311 using the random numbers acquired by the main random number acquiring section 313, a concealed random number transmitting section 317 that transmits the concealed random numbers generated by the random number concealment section 315, and a concealed matching information transmitting section 318 that transmits the concealed matching information generated by the matching information concealment section 316.

The decryption apparatus 320 includes a main random number receiving section 321 that receives the main random numbers, a first concealed similarity receiving section 322 that receives a first concealed similarity, a second concealed similarity receiving section 323 that receives a second concealed similarity, a decrypting section 324 that calculates a similarity from the main random numbers received by the main random number receiving section 321, the first concealed similarity received by the first concealed similarity receiving section 322, and the second concealed similarity received by the second concealed similarity receiving section 323, and a similarity transmitting section 325 that transmits the similarity calculated by the decrypting section 324.

The similarity calculating apparatus 330 includes a concealed random number receiving section 331 that receives the concealed random numbers, a concealed matching information receiving section 332 that receives the concealed matching information, a registration information acquiring section 333 that acquires registration information, a first concealed similarity calculating section 336 that calculates the first concealed similarity from the concealed random numbers received by the concealed random number receiving section 331 and the registration information received by the registration information acquiring section 333, a second concealed similarity calculating section 337 that calculates the second concealed similarity from the concealed matching information received by the concealed matching information receiving section 332 and the registration information received by the registration information acquiring section 333, a first concealed similarity transmitting section 338 that transmits the first concealed similarity calculated by the first concealed similarity calculating section 336, and a second concealed similarity transmitting section 339 that transmits the second concealed similarity calculated by the second concealed similarity calculating section 337.

The information identifying apparatus 340 includes a similarity receiving section 342 that receives the similarity, and an information identifying section 344 that identifies information using the similarity received by the similarity receiving section 342.

[Description of Operation]

Figure 7:
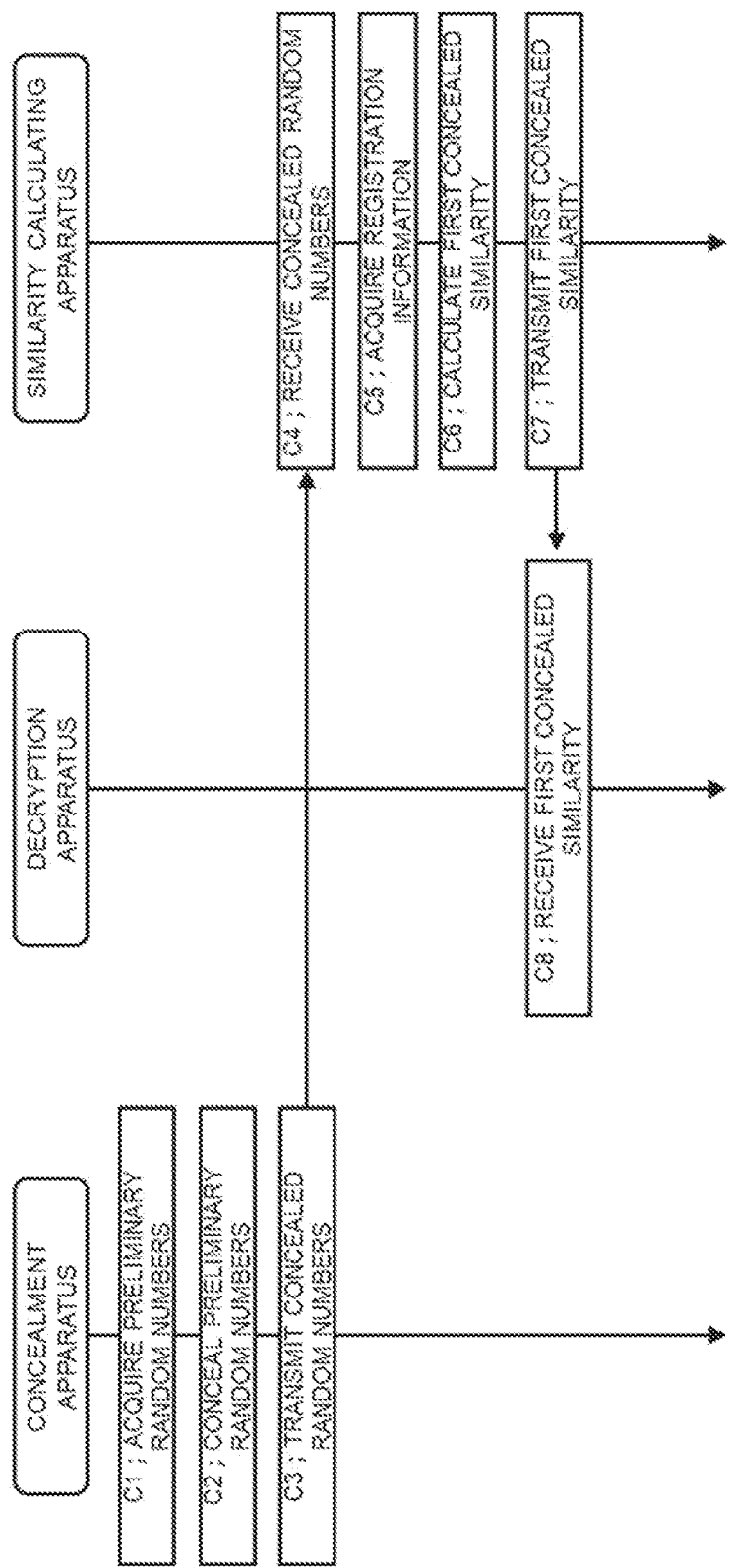
FIG. 7 is a flow diagram illustrating an operation of a preliminary calculation process of the information matching system according to the third example embodiment.

Next, with reference to FIGS. 7 and 8, an entire operation of the information matching system 300 according to the present example embodiment will be described. The processes performed in the information matching system 300 can be divided into two processes, a preliminary calculation process and a main calculation process. Hereinafter, each of operation examples of the processes will be descried. FIG. 7 is a flow diagram illustrating the preliminary calculation process of the information matching system 300. The preliminary calculation process is performed as described below by the concealment apparatus 310, the decryption apparatus 320, and the similarity calculating apparatus 330.

First, the preliminary random number acquiring section 312 in the concealment apparatus 310 acquires preliminary random numbers which are the random numbers used for the preliminary calculation process (step C1). Note that the random numbers may be acquired in any way. For example, the random numbers may be generated using a random number generating function that the concealment apparatus 310 has therein, or random numbers generated outside the concealment apparatus 310 may be acquired from an external apparatus.

Next, the random number concealment section 315 conceals the preliminary random numbers acquired in step C1 to generate concealed random numbers (step C2).

Next, the concealed random number transmitting section 317 transmits the concealed random numbers generated in step C2 to the similarity calculating apparatus 330 (step C3).

Next, the concealed random number receiving section 331 in the similarity calculating apparatus 330 receives the concealed random numbers from the concealment apparatus 310 (step C4).

Next, the registration information acquiring section 333 acquires registration information (step C5). The registration information may be stored anywhere. For example, a database storing the registration information may be included in the similarity calculating apparatus 330, or the registration information may be stored in an external apparatus connected with the similarity calculating apparatus 330. The registration information may include a plurality of pieces of information. In a case that a plurality of pieces of information are included, each piece of registration information is assigned with a specific identifier.

Next, the first concealed similarity calculating section 336 calculates a first concealed similarity from the concealed random numbers received in step C4 and the registration information acquired in step C5 (step C6).

Note that the first concealed similarity is a concealed form of the similarity between the concealed random numbers and the registration information. In the case that the registration information includes a plurality of pieces of information, the number of the calculated first concealed similarities is the same as the number of the plurality of pieces of information. Each first concealed similarity is assigned with a specific identifier, and which registration information the first concealed similarity corresponds to can be identified by the identifier. Note that the identifier assigned to each first concealed similarity may be the same as the identifier assigned to each piece of registration information.

Next, the first concealed similarity transmitting section 338 transmits the first concealed similarity calculated in step C6 to the decryption apparatus 320 (step C7).

Finally, the first concealed similarity receiving section 322 in the decryption apparatus 320 receives the first concealed similarity from the similarity calculating apparatus 330 (step C8).

Note that a procedure of the above process is an example. For example, the order of steps C4 and C5 may be exchanged.

Figure 8:
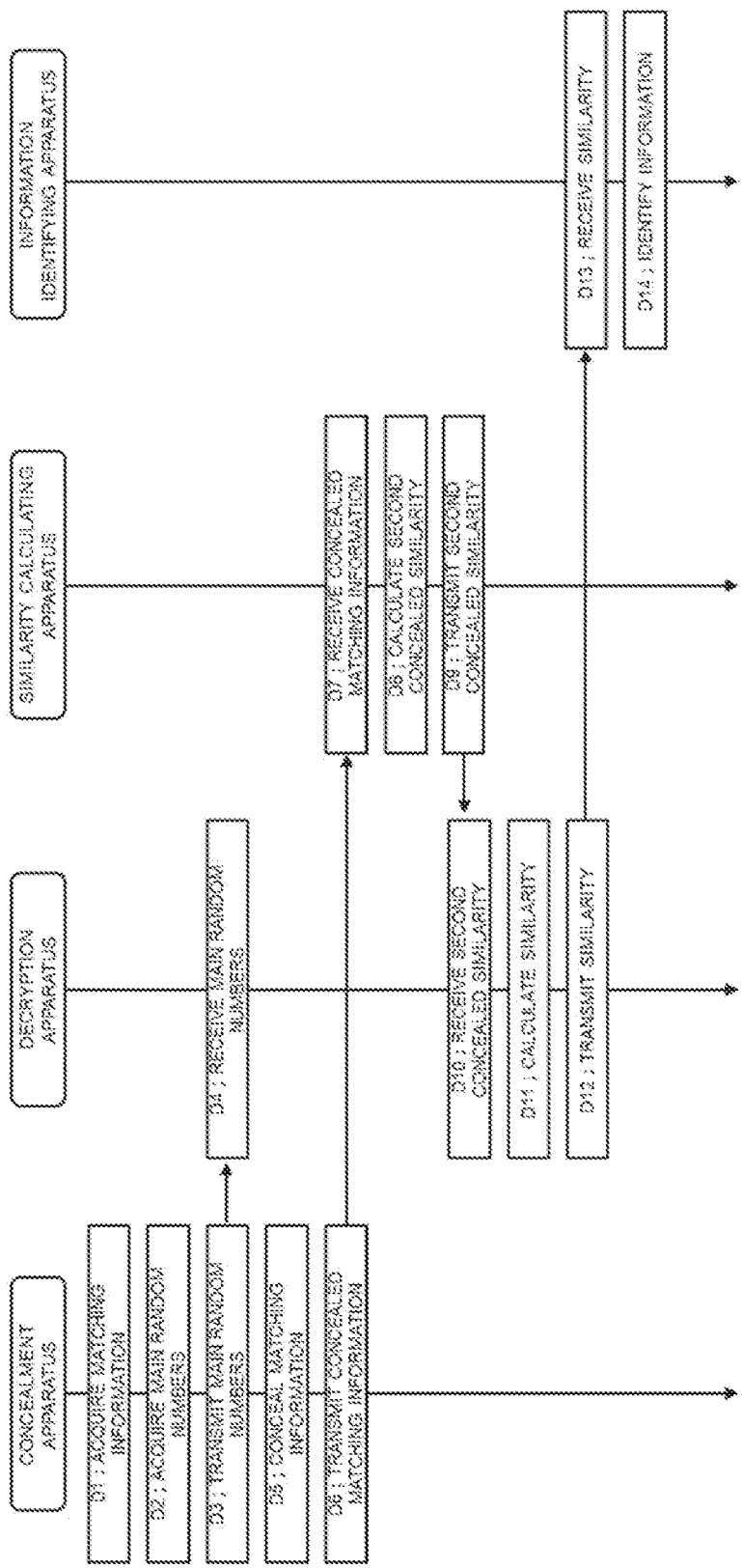
FIG. 8 is a flow diagram illustrating an operation of a main calculation process of the information matching system according to the third example embodiment.

FIG. 8 is a flow diagram illustrating the main calculation process of the information matching system 300. The main calculation process is performed as described below by the concealment apparatus 310, the decryption apparatus 320, the similarity calculating apparatus 330, and the information identifying apparatus 340.

First, the matching information acquiring section 311 in the concealment apparatus 310 acquires matching information (step D1). Note that the matching information may be acquired in any way. For example, the matching information may be generated using a matching information acquiring function that the concealment apparatus 310 has therein, or matching information generated outside the concealment apparatus 310 may be acquired from an external apparatus.

Next, the main random number acquiring section 313 acquires main random numbers which are random numbers used for the main calculation (step D2). Note that the random numbers may be acquired in any way. For example, the random numbers may be generated using a random number generating function that the concealment apparatus 310 has therein, or random numbers generated outside the concealment apparatus 310 may be acquired from an external apparatus.

Next, the main random number transmitting section 314 transmits the main random numbers acquired in step D2 to the decryption apparatus 320 (step D3).

Next, the main random number receiving section 321 in the decryption apparatus 320 receives the main random numbers from the concealment apparatus 310 (step D4).

Next, the matching information concealment section 316 conceals the matching information acquired in step D1 by a linear conversion using the preliminary random numbers acquired in step C1 and the main random numbers acquired in step D2 to generate concealed matching information (step D5).

Next, the concealed matching information transmitting section 318 transmits the concealed matching information generated in step D5 to the similarity calculating apparatus 330 (step D6).

Next, the concealed matching information receiving section 332 in the similarity calculating apparatus 330 receives the concealed matching information from the concealment apparatus 310 (step D7).

Next, the second concealed similarity calculating section 337 calculates a second concealed similarity from the registration information acquired in step C5 and the concealed matching information received in step D7 (step D8).

Note that the second concealed similarity is a concealed form of the similarity between the concealed matching information and the registration information. In the case that the registration information includes a plurality of pieces of information, the number of the calculated second concealed similarities is the same as the number of the plurality of pieces of information. Each second concealed similarity is assigned with a specific identifier, and which registration information the second concealed similarity corresponds to can be identified by the identifier. Note that the identifier assigned to each second concealed similarity may be the same as the identifier assigned to each piece of registration information.

Next, the second concealed similarity transmitting section 339 transmits the second concealed similarity calculated in step D8 to the decryption apparatus 320 (step D9).

Next, the second concealed similarity receiving section 323 in the decryption apparatus 320 receives the second concealed similarity from the similarity calculating apparatus 330 (step D10).

Next, the decrypting section 324 calculates a similarity from the first concealed similarity received in step C8 and the second concealed similarity received in step D10 using the main random numbers received in step D4 (step D11).

Note that the similarity is a similarity between the matching information and the registration information. In the case that the registration information includes a plurality of pieces of information, the number of the calculated similarities is the same as the number of the plurality of pieces of information. Each similarity is assigned with a specific identifier, and which registration information the similarity corresponds to can be identified by the identifier. Note that the identifier assigned to each similarity may be the same as the identifier assigned to each piece of registration information.

Next, the similarity transmitting section 325 transmits the similarity calculated in step D11 to the information identifying apparatus 340 (step D12).

Next, the similarity receiving section 342 in the information identifying apparatus 340 receives the similarity from the decryption apparatus 320 (step D13).

Finally, the information identifying section 344 identifies, among the similarities received in step D13, a similarity falling within a predefined acceptable range to identify registration information that is recognized to be sufficiently similar to the matching information (step D14).

Note that in a case that it is not necessary to identify the registration information recognized to be sufficiently similar to the matching information, but it is desired to check whether the registration information recognized to be sufficiently similar to the matching information is present or not, such processing may be made.

Concrete Example 1 According to Third Example Embodiment

Next, a concrete example 1 of the operation of the information matching system 300 according to the present example embodiment will be described.

In this concrete example, a case that a group on elliptic curve is used will be described. Assume that a group with an order of a κ-bit prime number q on an elliptic curve E and a generator G of the group are published.

In this concrete example, a case that vectors (with a dimension number of D) are used for the matching information and the registration information will be described. Furthermore, a case that the similarity between the matching information and the registration information is calculated by use of the inner product of the two vectors will be described. Assume a case that the matching information and the registration information are determined to be sufficiently similar to each other is a case that the similarity calculated by use of the inner product of the matching information and the registration information matches any one of T values $\theta_1, \ldots,$ and $\theta_\tau$.

In this concrete example, assume that pieces of information of N persons are registered in the database, and the pieces of the registration information of N persons are assigned with the identifiers of 1 to N.

However, a target of the present example embodiment is not limited to such cases above.

In the preliminary calculation process, first, the preliminary random number acquiring section 312 in the concealment apparatus 310 acquires, as preliminary random numbers, D κ-bit random numbers $s_1, \ldots,$ and $s_D$ (step C1). Hereinafter, the preliminary random numbers are expressed as a vector:

$$s=(s_1, \ldots, \text{ and } s_D).$$

Next, the random number concealment section 315 generates, as concealed random numbers, $$S_1=[s_1]G, \ldots, \text{ and } S_D=[s_D]G$$

(step C2).

Next, the concealed random number transmitting section 317 transmits the concealed random numbers $(S_1, \ldots,$ and $S_D)$ generated in step C2 to the similarity calculating apparatus 330 (step C3).

Next, the concealed random number receiving section 331 in the similarity calculating apparatus 330 receives the concealed random numbers $(S_1, \ldots,$ and $S_D)$ from the concealment apparatus 310 (step C4).

Next, the registration information acquiring section 333 acquires, as the registration information, N D-dimensional vectors $y_1, \ldots,$ and $y_N$ (where $y_i=(y_{i,1}, \ldots,$ and $y_{i,D})$ for all $i=1, \ldots,$ and N) (step C5).

Next, the first concealed similarity calculating section 336 calculates, as first concealed similarities for all $i=1, \ldots,$ and N, $$U_i=[<s,y_i>]G$$

from the concealed random numbers $(S_1, \ldots,$ and $S_D)$ received in step C4 and the registration information $y_i= \ldots,$ and $y_{i,D})$ for all $i=1, \ldots,$ and N acquired in step C5 (step C6).

Note that the first concealed transformed similarity for all $i=1, \ldots,$ and N can be calculated by, for example, $$([y_{i,1}]S_1+ \ldots +[y_{i,D}]S_D).$$

Next, the first concealed similarity transmitting section 338 transmits the first concealed similarities $(U_1, \ldots,$ and $U_N)$ calculated in step C6 to the decryption apparatus 320 (step C7).

In the preliminary calculation process, finally, the first concealed similarity receiving section 322 in the decryption apparatus 320 receives the first concealed similarities $(U_1, \ldots,$ and $U_N)$ from the similarity calculating apparatus 330 (step C8).

In the main calculation process, first, the matching information acquiring section 311 in the concealment apparatus 310 acquires, as the matching information, a D-dimensional vector:

$$x=(x_1, \ldots, \text{ and } x_D)$$

(step D1).

Next, the main random number acquiring section 313 acquires, as main random numbers, κ-bit random numbers a and b (step D2).

Next, the main random number transmitting section 314 transmits the main random numbers (a, b) generated in step D2 to the decryption apparatus 320 (step D3).

Next, the main random number receiving section 321 in the decryption apparatus 320 receives the main random numbers (a, b) from the concealment apparatus 310 (step D4).

Next, the matching information concealment section 316 in the concealment apparatus 310 calculates $$z_j=ax_j-bs_j$$

for all $j=1, \ldots,$ and D,
from the preliminary random number $s=(s_1, \ldots,$ and so) acquired in step C1,
the matching information $x=(x_1, \ldots,$ and $x_D)$ acquired in step D1, and
the main random numbers a and b acquired in step D2,
to obtain the concealed matching information $z=(z_1, \ldots,$ and $z_D)$ (step D5).

Next, the concealed matching information transmitting section 318 transmits the concealed matching information z generated in step D5 to the similarity calculating apparatus 330 (step D6).

Next, the concealed matching information receiving section 332 in the similarity calculating apparatus 330 receives the concealed matching information z from the concealment apparatus 310 (step D7).

Next, the second concealed similarity calculating section 337 calculates, as second concealed similarities for all $i=1, \ldots,$ and N, $$W_i=[<z,y_i>]G$$

from the registration information $y_1, \ldots,$ and $y_N$ (where $y_i=(y_{i,1}, \ldots,$ and $y_{i,D})$ for all $i=1, \ldots,$ and N) acquired in step C5, and
the concealed matching information $z=(z_1, \ldots,$ and $z_D)$ received in step D7 (step D8).

Note that because $z_j=ax_j-bs_j$ is satisfied for all $j=1, \ldots,$ and D, the second concealed similarities for all $i=1, \ldots,$ and N may be expressed as $$W_i=[(a<x,y_i>-b<s,y_i>)]G.$$

Next, the second concealed similarity transmitting section 339 transmits the second concealed similarities $(W_1, \ldots,$ and $W_N)$ calculated in step D8 to the decryption apparatus 320 (step D9).

Next, the second concealed similarity receiving section 323 in the decryption apparatus 320 receives the second concealed similarities ($W_1, \ldots,$ and $W_N$) from the similarity calculating apparatus 330 (step D10).

Next, the decrypting section 324 calculates, as points of similarities for all $i=1, \ldots,$ and N, $$[<x,y_i>]G$$

from the first concealed similarities ($U_1, \ldots,$ and $U_N$) received in step C8,
the main random numbers a and b received in step D4, and the second concealed transformed similarities ($W_1, \ldots,$ and $W_N$) received in step D10 (step D11).
Note that the point of similarity for all $i=1, \ldots,$ and N can be calculated as, for example, $$[a^{-1}]([b]U_i+W_i).$$

Next, the similarity transmitting section 325 transmits the points of similarities ($[<x, y_1>]G, \ldots,$ and $[<x, y_N>]G$) calculated in step D11 to the information identifying apparatus 340 (step D12).

Next, the similarity receiving section 342 in the information identifying apparatus 340 receives the points of similarities ($[<x, y_1>]G, \ldots,$ and $[<x, y_N>]G$) from the decryption apparatus 320 (step D13).

At the end of the main calculation process, the information identifying section 344 identifies, among the points of similarities ($[<x, y_1>]G, \ldots,$ and $[<x, y_N>]G$) received in step D13, a point of similarity falling within a point acceptable range ($[\theta_1]G, \ldots,$ and $[\theta_\tau]G$) corresponding to a predefined acceptable range ($\theta_1, \ldots,$ and $\theta_\tau$) (step D14).

Note that in this concrete example, although the points of similarities are calculated in step D11 and the information is identified from the points of similarities in step D14, a similarity may be further calculated from the points of similarities in step D11, or a similarity falling within the acceptable range may be further identified in step D11, and an identifier associated with the similarity identified may be transmitted in step D12.

This concrete example describes the example in which the similarity calculating apparatus 330 orders N concealed similarities to be transmitted to the decryption apparatus 320 in an index-based order of the registration information and transmits the resultant concealed similarities in step D9, but the similarity calculating apparatus 330 may assign a new identifier to each of the concealed similarities, shuffle the concealed similarities, and transmit the resultant concealed similarities to the decryption apparatus 320. At this time, the similarity calculating apparatus 330 may further give correspondences of two types of identifiers to the information identifying apparatus 340 so that the information identifying apparatus 340 can determine an identifier of the registration information that the information identifying apparatus 140 desires to identify.

Concrete Example 2 According to Third Example Embodiment

Next, a concrete example 2 of the operation of the information matching system 300 according to the present example embodiment will be described.

In this concrete example also, although a description is given assuming a case similar to the case of the concrete example 1 according to the third example embodiment, a target of the present example embodiment is not limited to these cases.

In the preliminary calculation process, first, the preliminary random number acquiring section 312 in the concealment apparatus 310 acquires, as preliminary random numbers, 2D κ-bit random numbers $s_1, \ldots,$ and $s_D$, $t_1, \ldots,$ and $t_D$ (step C1). Hereinafter, the preliminary random numbers are expressed as vectors:

$$s=(s_1, \ldots, \text{ and } s_D) \text{ and } t=(t_1, \ldots, \text{ and } t_D).$$

Next, the random number concealment section 315 generates, as concealed random numbers, $$S_1=[s_1]G, \ldots, \text{ and } S_D=[s_D]G, T_1=[t_1]G, \ldots, \text{ and } T_D=[t_D]G$$

(step C2).

Next, the concealed random number transmitting section 317 transmits the concealed random numbers ($S_1, \ldots,$ and $S_D$, $T_1, \ldots,$ and $T_D$) generated in step C2 to the similarity calculating apparatus 330 (step C3).

Next, the concealed random number receiving section 331 in the similarity calculating apparatus 330 receives the concealed random numbers ($S_1, \ldots,$ and $S_D$, $T_1, \ldots,$ and $T_D$) from the concealment apparatus 310 (step C4).

Next, the registration information acquiring section 333 acquires, as the registration information, N D-dimensional vectors $y_1, \ldots,$ and $y_N$ (where $y_i=(y_{i, 1}, \ldots,$ and $y_{i, D})$ for all $i=1, \ldots,$ and N) (step C5).

Next, the first concealed similarity calculating section 336 calculates, as first concealed similarities for all $i=1, \ldots,$ and N, $$U_i=[<s,y_i>]G \text{ and } U_i=[<t,y_i>]G$$

from the concealed random numbers ($S_1, \ldots,$ and $S_D$, $T_1, \ldots,$ and $T_D$) received in step C4, and
the registration information $y_i=(y_{i, 1}, \ldots,$ and $y_{i, D})$ for all $i=1, \ldots,$ and N acquired in step C5 (step C6).
Note that the first concealed similarity for all $i=1, \ldots,$ and N can be calculated by, for example, $$U_i=[y_{i,1}]S_1+ \ldots +[y_{i,D}]S_D \text{ and}$$

$$V_i=[y_{i,1}]T_1+ \ldots +[y_{i,D}]T_D.$$

Next, the first concealed similarity transmitting section 338 transmits the first concealed similarities ($U_1, \ldots,$ and $U_N$, $V_1, \ldots,$ and $V_N$) calculated in step C6 to the decryption apparatus 320 (step C7).

In the preliminary calculation process, finally, the first concealed similarity receiving section 322 in the decryption apparatus 320 receives the first concealed similarities ($U_1, \ldots,$ and $U_N$, $V_1, \ldots,$ and $V_N$) from the similarity calculating apparatus 330 (step C8).

In the main calculation process, first, the matching information acquiring section 311 in the concealment apparatus 310 acquires, as the matching information, a D-dimensional vector:

$$x=(x_1, \ldots, \text{ and } x_D)$$

(step D1).

Next, the main random number acquiring section 313 acquires, as main random numbers, κ-bit random number b (step D2).

Next, the main random number transmitting section 314 transmits the main random number b generated in step D2 to the decryption apparatus 320 (step D3).

Next, the main random number receiving section 321 in the decryption apparatus 320 receives the main random number b from the concealment apparatus 310 (step D4).

Next, the matching information concealment section 316 in the concealment apparatus 310 calculates $$z_j=x_j-bs_j-t_j$$

for all j=1, . . . , and D,
from the preliminary random number s=($s_1$, . . . , and $s_D$, $t_1$, . . . , and $t_D$) acquired in step C1,
the matching information x=($x_1$, . . . , and $x_D$) acquired in step D1, and
the main random number b acquired in step D2,
to obtain the concealed matching information z=($z_1$, . . . , and $z_D$) (step D5).

Next, the concealed matching information transmitting section 318 transmits the concealed matching information z generated in step D5 to the similarity calculating apparatus 330 (step D6).

Next, the concealed matching information receiving section 332 in the similarity calculating apparatus 330 receives the concealed matching information z from the concealment apparatus 310 (step D7).

Next, the second concealed similarity calculating section 337 calculates, as second concealed similarities for all i=1, . . . , and N, $$W_i = [<z, y_i>]G$$

from the registration information $y_1$, . . . , and $y_N$ (where y=($y_1$, 1, . . . , and $y_{i,D}$) for all i=1, . . . , and N) acquired in step C5 and
the concealed matching information z=($z_1$, . . . , and $z_D$) received in step D7 (step D8).
Note that because $z_j = z_j - bs_j - t_j$ is satisfied for all j=1, . . . , and D, the second concealed similarities for all i=1, . . . , and N may be expressed as $$W_i = [<x, y_i> - b<s, y_i> - <t, y_i>]G.$$

Next, the second concealed similarity transmitting section 339 transmits the second concealed similarities ($W_1$, . . . , and $W_N$) calculated in step D8 to the decryption apparatus 320 (step D9).

Next, the second concealed similarity receiving section 323 in the decryption apparatus 320 receives the second concealed similarities ($W_1$, . . . , and $W_N$) from the similarity calculating apparatus 330 (step D10).

Next, the decrypting section 324 calculates, as points of similarities for all i=1, . . . , and N, $$[<x, y_i>]G$$

from the first concealed similarities ($U_1$, . . . , and $U_N$, $V_1$, . . . , and $V_N$) received in step C8,
the main random number b received in step D4, and
the second concealed similarities ($W_1$, . . . , and $W_N$) received in step D10 (step D11).
Note that the point of similarity for all i=1, . . . , and N can be calculated as, for example, $$[b]U_i + V_i + W_i.$$

Next, the similarity transmitting section 325 transmits the points of similarities ([<x, $y_1$>]G, . . . , and [<x, $y_N$>]G) calculated in step D11 to the information identifying apparatus 340 (step D12).

Next, the similarity receiving section 342 in the information identifying apparatus 340 receives the points of similarities ([<x, $y_1$>]G, . . . , and [<x, $y_N$>]G) from the decryption apparatus 320 (step D13).

At the end of the main calculation process, the information identifying section 344 identifies, among the points of similarities ([<x, $y_1$>]G, . . . , and [<x, $y_N$>]G) received in step D13, a point of similarity falling within a point acceptable range ([$\theta_1$]G, . . . , and [$\theta_r$]G) corresponding to a predefined acceptable range ($\theta_1$, . . . , and $\theta_r$) (step D14).

Note that in this concrete example, although the points of similarities are calculated in step D11 and the information is identified from the points of similarities in step D14, a similarity may be further calculated from the points of similarities in step D11, or a similarity falling within the acceptable range may be further identified in step D11, and an identifier associated with the similarity identified may be transmitted in step D12.

This concrete example describes the example in which the similarity calculating apparatus 330 orders N concealed similarities to be transmitted to the decryption apparatus 320 in an index-based order of the registration information and transmits the resultant concealed similarities in step D9, but the similarity calculating apparatus 330 may assign a new identifier to each of the concealed similarities, shuffle the concealed similarities, and transmit the resultant concealed similarities to the decryption apparatus 320. At this time, the similarity calculating apparatus 330 may further give correspondences of two types of identifiers to the information identifying apparatus 340 so that the information identifying apparatus 340 can determine an identifier of the registration information that the information identifying apparatus 340 desires to identify.

[Description of Effect]

An effect of the present example embodiment described above is, similar to the first and second example embodiments, that the information matching securely using the biometric information can be realized with the cost less than that of the case of using an additive homomorphic public key cryptosystem. This is because in the concealment of the matching information in step D5, the concealment is performed by the linear conversion instead of a homomorphic operation of an additive homomorphic public key cryptosystem. The linear conversion, rather than the general concealment, is applied to allow the second concealed similarities and the similarities to be calculated in steps D8 and D11.

Furthermore, the present example embodiment has also an effect that the cost taken after acquiring the matching information can be reduced. This is because in the present example embodiment, a process not depending on the matching information is the preliminary calculation process, and thus, such process can be executed before acquiring the matching information.

Fourth Example Embodiment

[Description of Configuration]

Figure 9:
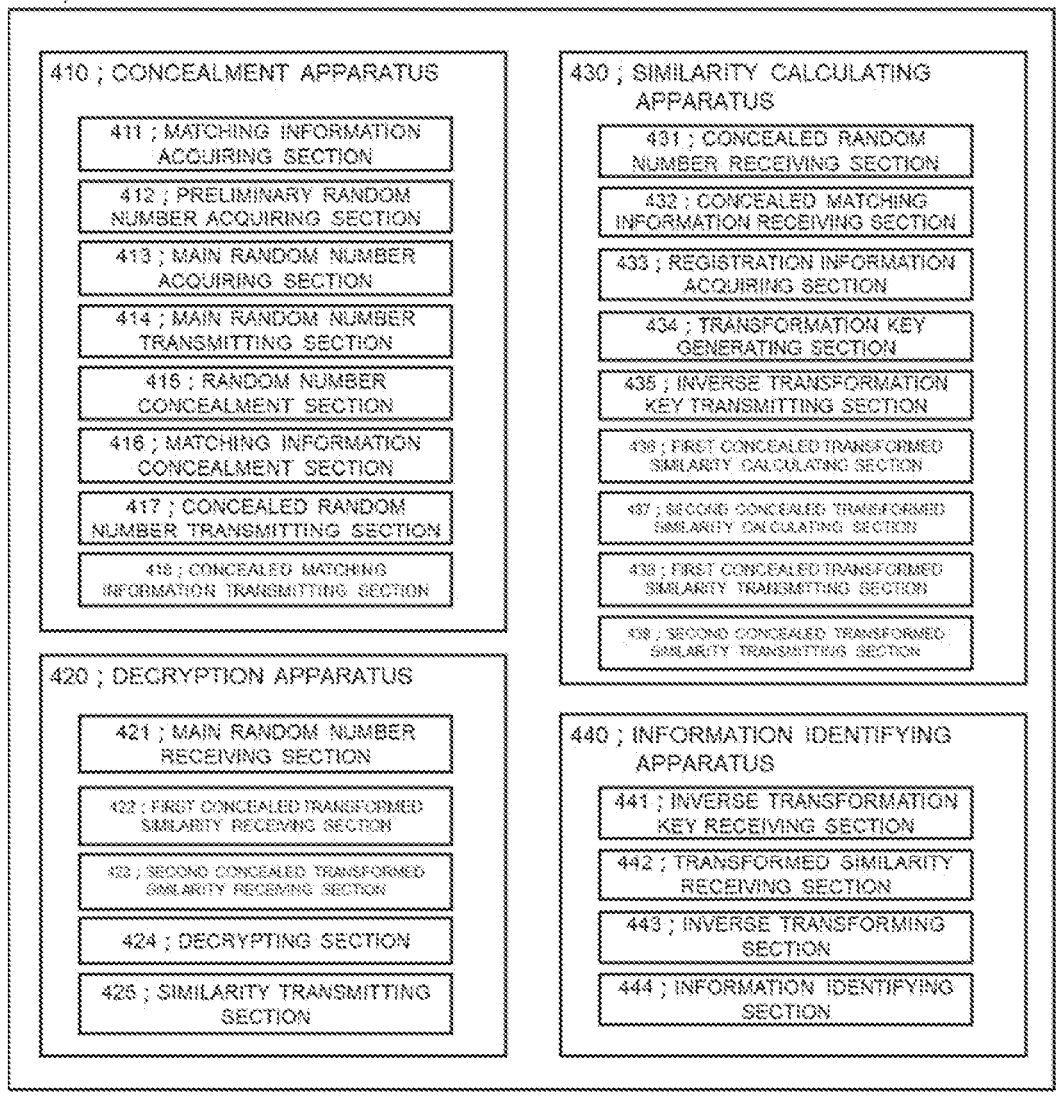
FIG. 9 is a block diagram illustrating a configuration of an information matching system according to a fourth example embodiment.

FIG. 9 is a block diagram illustrating a configuration of an information matching system 400 according to a fourth example embodiment. The information matching system 400 includes a concealment apparatus 410, a decryption apparatus 420, a similarity calculating apparatus 430, and an information identifying apparatus 440. However, the apparatuses included in the information matching system 400 may be configured as separate apparatuses, or may be adequately mounted on an identical apparatus as usage. For example, the information matching system 400 can be realized as a client-server system by separately mounting the concealment apparatus 410 and the decryption apparatus 420 on a client, and the similarity calculating apparatus 430 and the information identifying apparatus 440 on a server.

The apparatuses illustrated in FIG. 9 (the concealment apparatus 410, the decryption apparatus 420, the similarity calculating apparatus 430, and the information identifying apparatus 440) are connected in a wired or wireless manner and configured to be communicable with each other.

The concealment apparatus 410 includes
a matching information acquiring section 411 that acquires matching information,
a preliminary random number acquiring section 412 that acquires random numbers used for preliminary calculation,
a main random number acquiring section 413 that acquires random numbers used for main calculation,
a main random number transmitting section 414 that transmits the main random numbers acquired by the main random number acquiring section 413,
a random number concealment section 415 that conceals the random numbers acquired by the preliminary random number acquiring section 412,
a matching information concealment section 416 that conceals the matching information acquired by the matching information acquiring section 411 using the random numbers acquired by the main random number acquiring section 413,
a concealed random number transmitting section 417 that transmits the concealed random numbers generated by the random number concealment section 415, and
a concealed matching information transmitting section 418 that transmits the concealed matching information generated by the matching information concealment section 416.

The decryption apparatus 420 includes
a main random number receiving section 421 that receives the main random numbers,
a first concealed transformed similarity receiving section 422 that receives a first concealed transformed similarity,
a second concealed transformed similarity receiving section 423 that receives a second concealed transformed similarity,
a decrypting section 424 that calculates a transformed similarity from the main random numbers received by the main random number receiving section 421, the first concealed transformed similarity received by the first concealed transformed similarity receiving section 422, and the second concealed transformed similarity received by the second concealed transformed similarity receiving section 423, and
a similarity transmitting section 425 that transmits the transformed similarity calculated by the decrypting section 424.

The similarity calculating apparatus 430 includes
a concealed random number receiving section 431 that receives the concealed random numbers,
a concealed matching information receiving section 432 that receives the concealed matching information,
a registration information acquiring section 433 that acquires registration information,
a transformation key generating section 434 that generates a transformation key and an inverse transformation key,
an inverse transformation key transmitting section 435 that transmits the inverse transformation key generated by the transformation key generating section 434,
a first concealed transformed similarity calculating section 436 that calculates a first concealed transformed similarity from the concealed random numbers received by the concealed random number receiving section 431, the registration information received by the registration information acquiring section 433, and the transformation key generated by the transformation key generating section 434,
a second concealed transformed similarity calculating section 437 that calculates a second concealed transformed similarity from the concealed matching information received by the concealed matching information receiving section 432, the registration information received by the registration information acquiring section 433, and the transformation key generated by the transformation key generating section 434,
a first concealed transformed similarity transmitting section 438 that transmits the first concealed transformed similarity calculated by the first concealed transformed similarity calculating section 436, and
a second concealed transformed similarity transmitting section 439 that transmits the second concealed transformed similarity calculated by the second concealed transformed similarity calculating section 437.

The information identifying apparatus 440 includes
an inverse transformation key receiving section 441 that receives an inverse transformation key,
a transformed similarity receiving section 442 that receives the transformed similarity,
an inverse transforming section 443 that inversely transforms the transformed similarity received by the transformed similarity receiving section 442 using the inverse transformation key generated by the transformation key generating section 434, and
an information identifying section 444 that identifies information using the similarity calculated by the inverse transforming section 443.

[Description of Operation]

Next, with reference to FIGS. 10 and 11, an entire operation of the information matching system 400 according to the present example embodiment will be described. The processes performed in the information matching system 400, similar to the information matching system 300, can be divided into two processes, a preliminary calculation process and a main calculation process. Hereinafter, each of operation examples of the processes will be descried.

Figure 10:
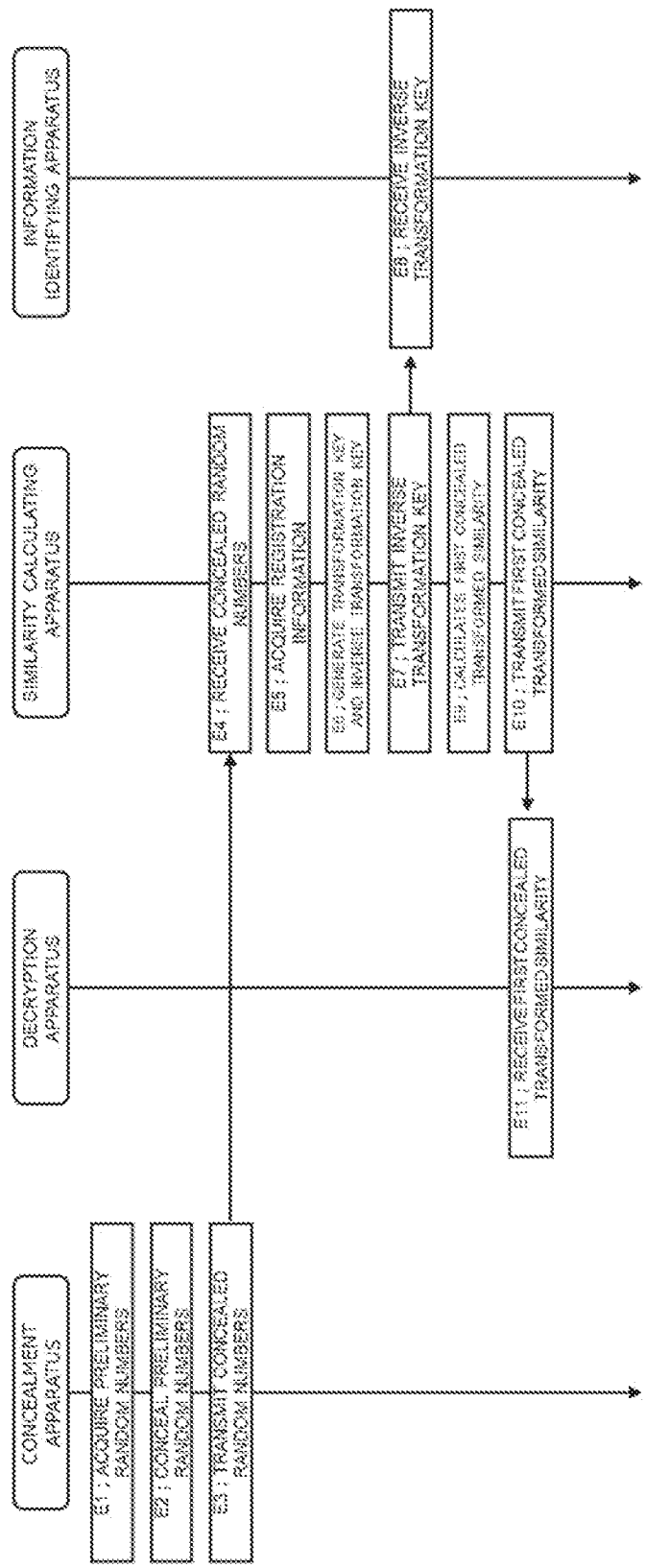
FIG. 10 is a flow diagram illustrating an operation of a preliminary calculation process of the information matching system according to the fourth example embodiment.

FIG. 10 is a flow diagram illustrating the preliminary calculation process of the information matching system 400. The preliminary calculation process is performed as described below by the concealment apparatus 410, the decryption apparatus 420, and the similarity calculating apparatus 430.

First, the preliminary random number acquiring section 412 in the concealment apparatus 410 acquires preliminary random numbers which are the random numbers used for the preliminary calculation process (step E1). Note that the random numbers may be acquired in any way. For example, the random numbers may be generated using a random number generating function that the concealment apparatus 410 has therein, or random numbers generated outside the concealment apparatus 410 may be acquired from an external apparatus.

Next, the random number concealment section 415 conceals the preliminary random numbers acquired in step E1 to generate concealed random numbers (step E2).

Next, the concealed random number transmitting section 417 transmits the concealed random numbers generated in step E2 to the similarity calculating apparatus 430 (step E3).

Next, the concealed random number receiving section 431 in the similarity calculating apparatus 430 receives the concealed random numbers from the concealment apparatus 410 (step E4).

Next, the registration information acquiring section 433 acquires registration information (step E5). The registration information may be stored anywhere. For example, a database storing the registration information may be included in the similarity calculating apparatus 430, or the registration information may be stored in an external apparatus connected with the similarity calculating apparatus 430. The registration information may include a plurality of pieces of information. In a case that a plurality of pieces of information are included, each piece of registration information is assigned with a specific identifier.

Next, the transformation key generating section 434 acquires the random numbers to generate a transformation key and an inverse transformation key based on the random number (step E6). Note that the random numbers may be acquired in any way. For example, the random numbers may be generated using a random number generating function that the similarity calculating apparatus 430 has therein, or random numbers generated outside the similarity calculating apparatus 430 may be acquired from an external apparatus.

Next, the inverse transformation key transmitting section 435 transmits the inverse transformation key generated in step E6 to the information identifying apparatus 440 (step E7).

Next, the inverse transformation key receiving section 441 in the information identifying apparatus 440 receives the inverse transformation key from the similarity calculating apparatus 430 (step E8).

Next, the first concealed transformed similarity calculating section 436 in the similarity calculating apparatus 430 calculates a first concealed transformed similarity from the concealed random numbers received in step E4, the registration information acquired in step E5, and the transformation key generated in step E6 (step E9).

Note that the first concealed transformed similarity is a concealed form of a value which is a transformed form of the similarity between the concealed random number and the registration information using the transformation key. In the case that the registration information includes a plurality of pieces of information, the number of the calculated first concealed transformed similarities is the same as the number of the plurality of pieces of information. Each first concealed transformed similarity is assigned with a specific identifier, and which registration information the first concealed transformed similarity corresponds to can be identified by the identifier. Note that the identifier assigned to each first concealed transformed similarity may be the same as the identifier assigned to each piece of registration information.

Next, the first concealed transformed similarity transmitting section 438 transmits the first concealed transformed similarity calculated in step E9 to the decryption apparatus 420 (step E10).

Finally, the first concealed transformed similarity receiving section 422 in the decryption apparatus 420 receives the first concealed transformed similarity from the similarity calculating apparatus 430 (step E11).

Note that a procedure of the above process is an example. For example, the order of steps E4, E5, and step E6 may be exchanged.

Figure 11:
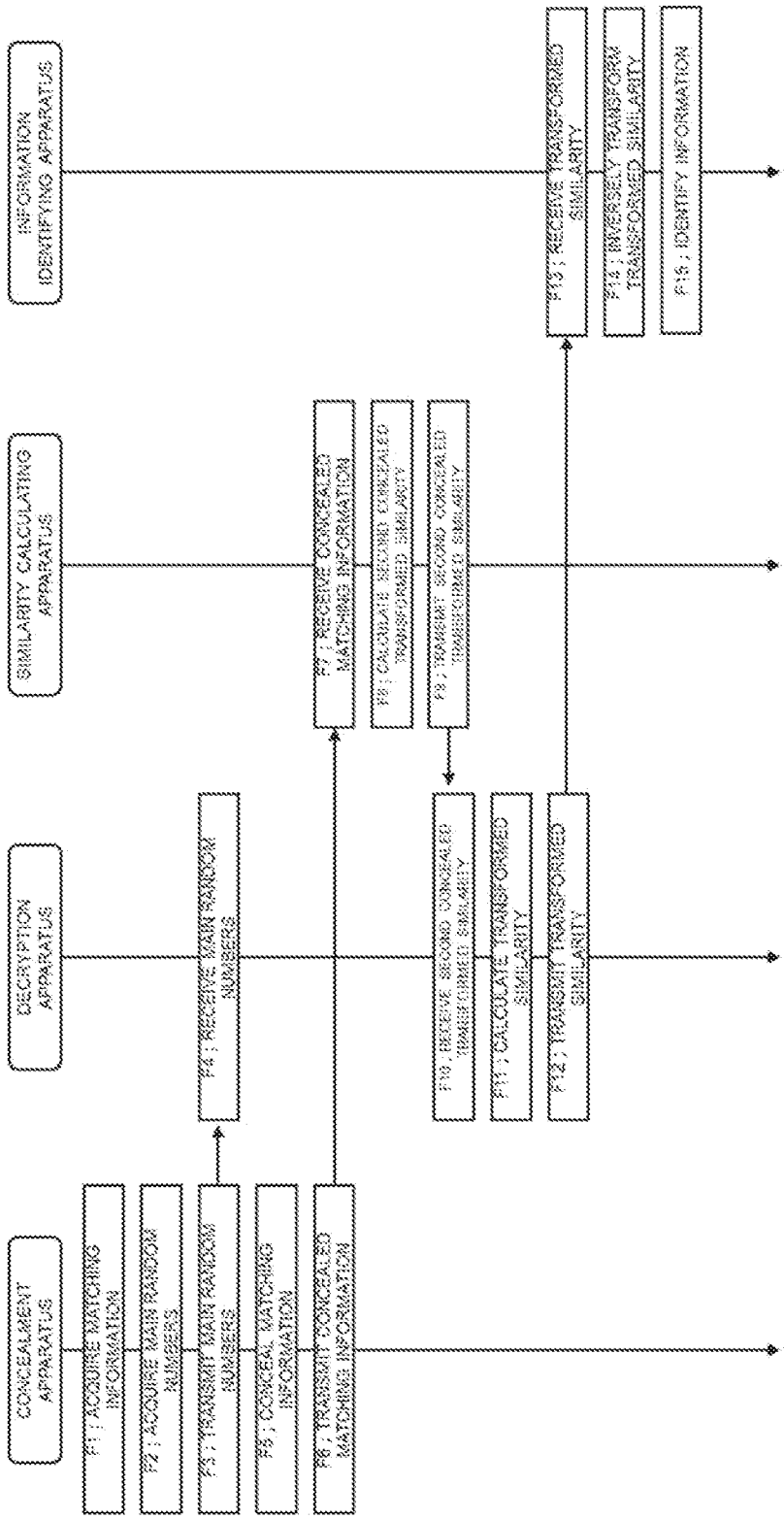
FIG. 11 is a flow diagram illustrating an operation of a main calculation process of the information matching system according to the fourth example embodiment.

FIG. 11 is a flow diagram illustrating the main calculation process of the information matching system 400. The main calculation process is performed as described below by the concealment apparatus 410, the decryption apparatus 420, the similarity calculating apparatus 430, and the information identifying apparatus 440.

First, the matching information acquiring section 411 in the concealment apparatus 410 acquires matching information (step F1). Note that the matching information may be acquired in any way. For example, the matching information may be generated using a matching information acquiring function that the concealment apparatus 410 has therein, or matching information generated outside the concealment apparatus 410 may be acquired from an external apparatus.

Next, the main random number acquiring section 413 acquires main random numbers which are random numbers used for the main calculation (step F2). Note that the random numbers may be acquired in any way. For example, the random numbers may be generated using a random number generating function that the concealment apparatus 410 has therein, or random numbers generated outside the concealment apparatus 410 may be acquired from an external apparatus.

Next, the main random number transmitting section 414 transmits the main random numbers generated in step F2 to the decryption apparatus 420 (step F3).

Next, the main random number receiving section 421 in the decryption apparatus 420 receives the main random numbers from the concealment apparatus 410 (step F4).

Next, the matching information concealment section 416 in the concealment apparatus 410 conceals the matching information acquired in step F1 by a linear conversion using the preliminary random numbers acquired in step E1 and the main random numbers acquired in step F2 to generate concealed matching information (step F5).

Next, the concealed matching information transmitting section 418 transmits the concealed matching information generated in step F5 to the similarity calculating apparatus 430 (step F6).

Next, the concealed matching information receiving section 432 in the similarity calculating apparatus 430 receives the concealed matching information from the concealment apparatus 410 (step F7).

Next, the second concealed transformed similarity calculating section 437 calculates a second concealed similarity from the registration information acquired in step E5, the transformation key generated in step E6, and the concealed matching information received in step F7 (step F8).

Note that the second concealed transformed similarity is a concealed form of a value which is a transformed form of the similarity between the concealed matching information and the registration information using the transformation key. In the case that the registration information includes a plurality of pieces of information, the number of the calculated second concealed transformed similarities is the same as the number of the plurality of pieces of information. Each second concealed transformed similarity is assigned with a specific identifier, and which registration information the second concealed transformed similarity corresponds to can be identified by the identifier. Note that the identifier assigned to each second concealed transformed similarity may be the same as the identifier assigned to each piece of registration information.

Next, the second concealed transformed similarity transmitting section 439 transmits the second concealed transformed similarity calculated in step F8 to the decryption apparatus 420 (step F9).

Next, the second concealed transformed similarity receiving section 423 in the decryption apparatus 420 receives the second concealed transformed similarity from the similarity calculating apparatus 430 (step F10).

Next, the decrypting section 424 calculates a transformed similarity from the first concealed transformed similarity received in step E11 and the second concealed transformed similarity received in step F10 using the main random numbers received in step F4 (step F11).

Note that the transformed similarity is a transformed form of the similarity between the matching information and the registration information using the transformation key. In the case that the registration information includes a plurality of pieces of information, the number of the calculated transformed similarities is the same as the number of the plurality of pieces of information. Each transformed similarity is assigned with a specific identifier, and which registration information the transformed similarity corresponds to can be identified by the identifier. Note that the identifier assigned to each transformed similarity may be the same as the identifier assigned to each piece of registration information.

Next, the similarity transmitting section 425 transmits the transformed similarity calculated in step F11 to the information identifying apparatus 440 (step F12).

Next, the transformed similarity receiving section 442 in the information identifying apparatus 440 receives the transformed similarity from the decryption apparatus 420 (step F13).

Next, the inverse transforming section 443 inversely transforms the transformed similarity received in step F13 using the inverse transformation key received in step E8 to calculate a similarity (step F14).

Note that the similarity is a similarity between the matching information and the registration information. In the case that the registration information includes a plurality of pieces of information, the number of the calculated similarities is the same as the number of the plurality of pieces of information. Each similarity is assigned with a specific identifier, and which registration information the similarity corresponds to can be identified by the identifier. Note that the identifier assigned to each similarity may be the same as the identifier assigned to each piece of registration information.

Finally, the information identifying section 444 identifies, among the similarities calculated in step F14, a similarity falling within a predefined acceptable range to identify registration information that is recognized to be sufficiently similar to the matching information (step F15).

Note that in a case that it is not necessary to identify the registration information recognized to be sufficiently similar to the matching information, but it is desired to check whether the registration information recognized to be sufficiently similar to the matching information is present or not, such processing may be made.

Concrete Example 1 According to Fourth Example Embodiment

Next, a concrete example 1 of the operation of the information matching system 400 according to the present example embodiment will be described.

In this concrete example, a case that a group on elliptic curve is used will be described. Assume that a group with an order of a $\kappa$-bit prime number q on an elliptic curve E and a generator G of the group are published.

In this concrete example, a case that vectors (with a dimension number of D) are used for the matching information and the registration information will be described. Furthermore, a case that the similarity between the matching information and the registration information is calculated by use of the inner product of the two vectors will be described. Assume a case that the matching information and the registration information are determined to be sufficiently similar to each other is a case that the similarity calculated by use of the inner product of the matching information and the registration information matches any one of T values $\theta_1, \ldots,$ and $\theta_\tau$.

In this concrete example, assume that pieces of information of N persons are registered in the database, and the pieces of the registration information of N persons are assigned with the identifiers of 1 to N.

However, a target of the present example embodiment is not limited to such cases above.

In the preliminary calculation process, first, the preliminary random number acquiring section 412 in the concealment apparatus 410 acquires, as preliminary random numbers, D $\kappa$-bit random numbers $s_1, \ldots,$ and $s_D$ (step E1). Hereinafter, the preliminary random numbers are expressed as a vector:

$$s=(s_1, \ldots, \text{and } s_D).$$

Next, the random number concealment section 415 generates, as concealed random numbers, $$S_1=[s_1]G, \ldots, \text{and } S_D=[s_D]G$$

(step E2).

Next, the concealed random number transmitting section 417 transmits the concealed random numbers $(S_1, \ldots,$ and $S_D)$ generated in step E2 to the similarity calculating apparatus 430 (step E3).

Next, the concealed random number receiving section 431 in the similarity calculating apparatus 430 receives the concealed random numbers $(S_1, \ldots,$ and $S_D)$ from the concealment apparatus 410 (step E4).

Next, the registration information acquiring section 433 acquires, as the registration information, N D-dimensional vectors $y_1, \ldots,$ and $y_N$ (where $y_i=(y_{i,1}, \ldots,$ and $y_{i,D})$ for all i=1, . . . , and N) (step E5).

Next, the transformation key generating section 434 acquires D $\kappa$-bit random numbers $r_1, \ldots,$ and $r_N$ to obtain the transformation keys $(r_1, \ldots,$ and $r_N)$ and the inverse transformation keys $((r_1)^{-1}, \ldots,$ and $(r_N)^{-1})$ (step E6).

Next, the inverse transformation key transmitting section 435 transmits the inverse transformation keys $((r_1)^{-1}, \ldots,$ and $(r_N)^{-1})$ generated in step E6 to the information identifying apparatus 440 (step E7).

Next, the inverse transformation key receiving section 441 in the information identifying apparatus 440 receives the inverse transformation keys $((r_1)^{-1}, \ldots,$ and $(r_N)^{-1})$ from the similarity calculating apparatus 430 (step E8).

Next, the first concealed transformed similarity calculating section 436 in the similarity calculating apparatus 430 calculates, as first concealed transformed similarities for all i=1, . . . , and N, $$U_i=[r_i\langle s,y_i\rangle]G$$

from the concealed random numbers $(S_1, \ldots,$ and $S_D)$ received in step E4,
the registration information $y_i=(y_{i,1}, \ldots,$ and $y_{i,D})$ for all i=1, . . . , and N acquired in step E5, and
the transformation keys $r_i$ for all i=1, . . . , and N generated in step E6 (step E9).

Note that the first concealed transformed similarity for all i=1, . . . , and N can be calculated by, for example, $$[r_i]([y_{i,1}]S_1+ \ldots +[y_{i,D}]S_D).$$

Next, the first concealed transformed similarity transmitting section 438 transmits the first concealed transformed similarities $(U_1, \ldots,$ and $U_N)$ calculated in step E9 to the decryption apparatus 420 (step E10).

In the preliminary calculation process, finally, the first concealed transformed similarity receiving section 422 in the decryption apparatus 420 receives the first concealed transformed similarities $(U_1, \ldots,$ and $U_N)$ from the similarity calculating apparatus 430 (step E11).

In the main calculation process, first, the matching information acquiring section 411 in the concealment apparatus 410 acquires, as the matching information, a D-dimensional vector:

$$x=(x_1, \ldots, \text{and } x_D)$$

(step F1).

Next, the main random number acquiring section 413 acquires, as main random numbers, κ-bit random numbers a and b (step F2).

Next, the main random number transmitting section 414 transmits the main random numbers (a, b) generated in step F2 to the decryption apparatus 420 (step F3).

Next, the main random number receiving section 421 in the decryption apparatus 420 receives the main random numbers (a, b) from the concealment apparatus 410 (step F4).

Next, the matching information concealment section 416 in the concealment apparatus 410 calculates $$z_j = ax_j - bs_j$$

for all $j=1, \ldots,$ and D,
from the preliminary random number $s=(s_1, \ldots,$ and $s_D)$ acquired in step E1,
the matching information $x=(x_1, \ldots,$ and $x_D)$ acquired in step F1, and
the main random numbers a and b acquired in step F2,
to obtain the concealed matching information $z=(z_1, \ldots,$ and $z_D)$ (step F5).

Next, the concealed matching information transmitting section 418 transmits the concealed matching information z generated in step F5 to the similarity calculating apparatus 430 (step F6).

Next, the concealed matching information receiving section 432 in the similarity calculating apparatus 430 receives the concealed matching information z from the concealment apparatus 410 (step F7).

Next, the second concealed transformed similarity calculating section 437 calculates, as second concealed transformed similarities for all $i=1, \ldots,$ and N, $$W_i = [r_i \langle z, y_i \rangle] G$$

from the registration information $y_1, \ldots,$ and $y_N$ (where $y_i = (y_{i,1}, \ldots,$ and $y_{i,D})$ for all $i=1, \ldots,$ and N) acquired in step E5,
the transformation keys $(r_1, \ldots,$ and $r_N)$ generated in step E6, and
the concealed matching information $z=(z_1, \ldots,$ and $z_D)$ received in step F7 (step F8).

Note that because $z_j = ax_j - bs_j$ is satisfied for all $j=1, \ldots,$ and D,
the second concealed transformed similarities for all $i=1, \ldots,$ and N may be expressed as $$W_i = [r_i(a\langle x, y_i\rangle - b\langle s, y_i\rangle)] G.$$

Next, the second concealed transformed similarity transmitting section 439 transmits the second concealed transformed similarities $(W_1, \ldots,$ and $W_N)$ calculated in step F8 to the decryption apparatus 420 (step F9).

Next, the second concealed transformed similarity receiving section 423 in the decryption apparatus 420 receives the second concealed transformed similarities $(W_1, \ldots,$ and $W_N)$ from the similarity calculating apparatus 430 (step F10).

Next, the decrypting section 424 calculates, as transformed similarities for all $i=1, \ldots,$ and N, $$A_i = [r_i \langle x, y_i \rangle] G$$

from the first concealed transformed similarities $(U_1, \ldots,$ and $U_N)$ received in step E11,
the main random numbers a and b received in step F4, and
the second concealed transformed similarities $(W_1, \ldots,$ and $W_N)$ received in step F10 (step F11).

Note that the transformed similarity for all $i=1, \ldots,$ and N can be calculated as, for example, $$[a^{-1}]([b]U_i + W_i).$$

Next, the similarity transmitting section 425 transmits the transformed similarities $(A_1, \ldots,$ and $A_N)$ calculated in step F11 to the information identifying apparatus 440 (step F12).

Next, the transformed similarity receiving section 442 in the information identifying apparatus 440 receives the transformed similarities $(A_1, \ldots,$ and $A_N)$ from the decryption apparatus 420 (step F13).

Next, the inverse transforming section 443 calculates, as points of similarities for all $i=1, \ldots,$ and N, $$[\langle x, y_i \rangle] G$$

from the inverse transformation keys $((r_1)^{-1}, \ldots,$ and $(r_N)^{-1})$ received in step E8 and
the transformed similarities $(A_1, \ldots,$ and $A_N)$ received in step F13 (step F14).

Note that the point of similarity for all $i=1, \ldots,$ and N can be calculated as, for example, $$[(r_i)^{-1}](A_i).$$

At the end of the main calculation process, the information identifying section 444 identifies, among the points of similarities $([\langle x, y_1 \rangle] G, \ldots,$ and $[\langle x, y_N \rangle] G)$ calculated in step F14, a point of similarity falling within a point acceptable range $([\theta_1] G, \ldots,$ and $[\theta_\tau] G)$ corresponding to a predefined acceptable range $(\theta_1, \ldots,$ and $\theta_\tau)$ (step F15).

This concrete example describes the example in which the similarity calculating apparatus 430 orders N concealed similarities to be transmitted to the decryption apparatus 420 in an index-based order of the registration information and transmits the resultant concealed similarities in step F9, but the similarity calculating apparatus 430 may assign a new identifier to each of the concealed similarities, shuffle the concealed similarities, and transmit the resultant concealed similarities to the decryption apparatus 420. At this time, the similarity calculating apparatus 430 may further give correspondences of two types of identifiers to the information identifying apparatus 440 so that the information identifying apparatus 440 can determine an identifier of the registration information that the information identifying apparatus 440 desires to identify.

Concrete Example 2 According to Fourth Example Embodiment

Next, a concrete example 2 of the operation of the information matching system 400 according to the present example embodiment will be described.

In this concrete example also, although a description is given assuming a case similar to the case of the concrete example 1 according to the fourth example embodiment, a target of the present example embodiment is not limited to these cases.

In the preliminary calculation process, first, the preliminary random number acquiring section 412 in the concealment apparatus 410 acquires, as preliminary random numbers, 2D κ-bit random numbers $s_1, \ldots,$ and $s_D, t_1, \ldots,$ and $t_D$ (step E1). Hereinafter, the preliminary random numbers are expressed as vectors:

$$s=(s_1, \ldots, \text{and } s_D) \text{ and } t=(t_1, \ldots, \text{and } t_D).$$

Next, the random number concealment section 415 generates, as concealed random numbers, $$S_1=[s_1]G, \ldots, \text{ and } S_D=[s_D]G, T_1=[t_1]G, \ldots, \text{ and } T_D=[t_D]G$$

(step E2).

Next, the concealed random number transmitting section 417 transmits the concealed random numbers ($S_1, \ldots,$ and $S_D, T_1, \ldots,$ and $T_D$) generated in step E2 to the similarity calculating apparatus 430 (step E3).

Next, the concealed random number receiving section 431 in the similarity calculating apparatus 430 receives the concealed random numbers ($S_1, \ldots,$ and $S_D, T_1, \ldots,$ and $T_D$) from the concealment apparatus 410 (step E4).

Next, the registration information acquiring section 433 acquires, as the registration information, N D-dimensional vectors $y_1, \ldots,$ and $y_N$ (where $y_i=(y_{i,1}, \ldots,$ and $y_{i,D})$ for all $i=1, \ldots,$ and N) (step E5).

Next, the transformation key generating section 434 acquires D κ-bit random numbers $r_1, \ldots,$ and $r_N$ to let ($r_1, \ldots,$ and $r_N$) be the transformation keys and $((r_1)^{-1}, \ldots,$ and $(r_N)^{-1})$ be the inverse transformation keys (step E6).

Next, the inverse transformation key transmitting section 435 transmits the inverse transformation keys $((r_1)^{-1}, \ldots,$ and $(r_N)^{-1})$ generated in step E6 to the information identifying apparatus 440 (step E7).

Next, the inverse transformation key receiving section 441 in the information identifying apparatus 440 receives the inverse transformation keys $((r_1)^{-1}, \ldots,$ and $(r_N)^{-1})$ from the similarity calculating apparatus 430 (step E8).

Next, the first concealed transformed similarity calculating section 436 calculates, as first concealed transformed similarities for all $i=1, \ldots,$ and N, $$U_i=[r_i<s,y_i>]G \text{ and } U_i=[r_i<t,y_i>]G$$

from the concealed random numbers ($S_1, \ldots,$ and $S_D, T_1, \ldots,$ and $T_D$) received in step E4, the registration information $y_i=(y_{i,1}, \ldots,$ and $y_{i,D})$ for all $i=1, \ldots,$ and N acquired in step E5, and
the transformation keys $r_i$ for all $i=1, \ldots,$ and N generated in step E6 (step E9).

Note that the first concealed transformed similarity for all $i=1, \ldots,$ and N can be calculated by, for example, $$U_i=[r_i]([y_{i,1}]S_1+ \ldots +[y_{i,D}]S_D) \text{ and}$$

$$V_i=[r_i]([y_{i,1}]T_1+ \ldots +[y_{i,D}]T_D).$$

Next, the first concealed transformed similarity transmitting section 438 transmits the concealed transformed similarities ($U_1, \ldots,$ and $U_N, V_1, \ldots,$ and $V_N$) calculated in step E9 to the decryption apparatus 420 (step E10).

In the preliminary calculation process, finally, the first concealed transformed similarity receiving section 422 in the decryption apparatus 420 receives the first concealed transformed similarities ($U_1, \ldots,$ and $U_N, V_1, \ldots,$ and $V_N$) from the similarity calculating apparatus 430 (step E11).

In the main calculation process, first, the matching information acquiring section 411 in the concealment apparatus 410 acquires, as the matching information, a D-dimensional vector:

$$x=(x_1, \ldots, \text{ and } x_D)$$

(step F1).

Next, the main random number acquiring section 413 acquires, as main random numbers, κ-bit random number b (step F2).

Next, the main random number transmitting section 414 transmits the main random number b generated in step F2 to the decryption apparatus 420 (step F3).

Next, the main random number receiving section 421 in the decryption apparatus 420 receives the main random number b from the concealment apparatus 410 (step F4).

Next, the matching information concealment section 416 in the concealment apparatus 410 calculates $$z_j=x_j-bs_j-t_j$$

for all $j=1, \ldots,$ and D,
from the preliminary random number $s=(s_1, \ldots,$ and $s_D, t_1, \ldots,$ and $t_D)$ acquired in step E1,
the matching information $x=(x_1, \ldots,$ and $x_D)$ acquired in step F1, and
the main random number b acquired in step F2,
to obtain the concealed matching information $z=(z_1, \ldots,$ and $z_D)$ (step F5).

Next, the concealed matching information transmitting section 418 transmits the concealed matching information z generated in step F5 to the similarity calculating apparatus 430 (step F6).

Next, the concealed matching information receiving section 432 in the similarity calculating apparatus 430 receives the concealed matching information z from the concealment apparatus 410 (step F7).

Next, the second concealed transformed similarity calculating section 437 calculates, as second concealed transformed similarities for all $i=1, \ldots,$ and N, $$W_i=[r_i<z,y_i>]G$$

from the registration information $y_1, \ldots,$ and $y_N$ (where $y_i=(y_{i,1}, \ldots,$ and $y_{i,D})$ for all $i=1, \ldots,$ and N) acquired in step E5,
the transformation keys ($r_1, \ldots,$ and $r_N$) generated in step E6, and
the concealed matching information $z=(z_1, \ldots,$ and $z_D$) received in step F7 (step F8).

Note that because $z_j=x_j-bs_j-t_j$ is satisfied for all $j=1, \ldots,$ and D, the second concealed transformed similarities for all $i=1, \ldots,$ and N may be expressed as $$W_i=[r_i(<x,y_i>-b<s,y_i>-<t,y_i>)]G.$$

Next, the second concealed transformed similarity transmitting section 439 transmits the second concealed transformed similarities ($W_1, \ldots,$ and $W_N$) calculated in step F8 to the decryption apparatus 420 (step F9).

Next, the second concealed transformed similarity receiving section 423 in the decryption apparatus 420 receives the second concealed transformed similarities ($W_1, \ldots,$ and $W_N$) from the similarity calculating apparatus 430 (step F10).

Next, the decrypting section 424 calculates, as transformed similarities for all $i=1, \ldots,$ and N, $$A_i=[r_i<x,y_i>]G$$

from the first concealed transformed similarities ($U_1, \ldots,$ and $U_N, V_1, \ldots,$ and $V_N$) received in step E11,
the main random number b received in step F4, and
the second concealed transformed similarities ($W_1, \ldots,$ and $W_N$) received in step F10 (step F11).

Note that the transformed similarity for all $i=1, \ldots,$ and N can be calculated as, for example, $$[b]U_i+V_i+W_i.$$

Next, the similarity transmitting section 425 transmits the transformed similarities ($A_1, \ldots,$ and $A_N$) calculated in step F11 to the information identifying apparatus 440 (step F12).

Next, the transformed similarity receiving section 442 in the information identifying apparatus 440 receives the transformed similarities ($A_1, \ldots,$ and $A_N$) from the decryption apparatus 420 (step F13).

Next, the inverse transforming section 443 calculates, as points of similarities for all $i=1, \ldots,$ and N, $$[<x, y_i>]G$$

from the inverse transformation keys $((r_1)^{-1}, \ldots,$ and $(r_N)^{-1})$ received in step E8 and the transformed similarities ($A_1, \ldots,$ and $A_N$) received in step F13 (step F14).

Note that the point of similarity for all $i=1, \ldots,$ and N can be calculated as, for example, $$[(r_i)^{-1}](A_i).$$

At the end of the main calculation process, the information identifying section 444 identifies, among the points of similarities ($[<x, y_1>]G, \ldots,$ and $[<x, y_N>]G$) calculated in step F14, a point of similarity falling within a point acceptable range ($[\theta_1]G, \ldots,$ and $[\theta_\tau]G$) corresponding to a predefined acceptable range ($\theta_1, \ldots,$ and $\theta_\tau$) (step F15).

This concrete example describes the example in which the similarity calculating apparatus 130 orders N concealed similarities to be transmitted to the decryption apparatus 120 in an index-based order of the registration information and transmits the resultant concealed similarities in step A10, but the similarity calculating apparatus 130 may assign a new identifier to each of the concealed similarities, shuffle the concealed similarities, and transmit the resultant concealed similarities to the decryption apparatus 120. At this time, the similarity calculating apparatus 130 may further give correspondences of two types of identifiers to the information identifying apparatus 140 so that the information identifying apparatus 140 can determine an identifier of the registration information that the information identifying apparatus 140 desires to identify.

[Description of Effect]

An effect of the present example embodiment described above is, similar to the first, second, and third example embodiments, that the information matching securely using the biometric information can be realized with the cost less than that of the case of using an additive homomorphic public key cryptosystem. This is because in the concealment of the matching information in step F5, the concealment is performed by the linear conversion instead of a homomorphic operation of an additive homomorphic public key cryptosystem. The linear conversion, rather than the general concealment, is applied to allow the second concealed transformed similarities and the transformed similarities to be calculated in steps F8 and F11.

Furthermore, the present example embodiment, similar to the second example embodiment, has an effect that the present example embodiment can be executed without leaking the value of the similarity to the decryption apparatus 420, even in a case that the decryption apparatus 420 has information related to a random number other than the main random number, such as a case that the concealment apparatus 410 and the decryption apparatus 420 are mounted on the same apparatus. This is because the decryption apparatus 420 acquires the similarity that is transformed based on the transformation key generated by the similarity calculating apparatus 430.

Furthermore, the present example embodiment, similar to the third example embodiment, has also an effect that the cost taken after acquiring the matching information can be reduced. This is because in the present example embodiment, a process not depending on the matching information is the preliminary calculation process, and thus, such process can be executed before acquiring the matching information.

As described above, the techniques according to the present invention make it possible to match, at high speed, biometric information acquired by a sensor such as a camera and biometric information of one or a plurality of persons stored in a database with the both biometric information being concealed. This is effective in some cases that a manager (managing organization) of the sensor and a manager (managing organization) of the database are different from each other.

The techniques according to the present invention can be used for, for example, white list matching. An entrance and exit control of a building such as an office building is described as an example. A case is assumed that it is desired to check whether or not a person trying to pass through an entrance and exit gate owned by a manager (an organization) of the building is included in a list of employees of a tenant of the building or guests. In such a case, the use of the techniques according to the present invention enables the high speed matching without disclosing biometric information or the like of persons acquired at the entrance and exit gate to a tenant other than a tenant the person belongs to or is to visit by the manager (managing organization) of the building, or without disclosing biometric information or the like of the employees or the guests to the manager (the organization) or the building by each tenant.

Security check in an airport and the like is described as another example of the use of the white list matching. In an airport, passport information is used at customs, a boarding gate, or various places for shopping, and a passenger presents a passport at every place. In order to eliminate the need of presenting and checking the passport, cases of using face authentication is increasing that a passport photograph of the passenger acquired by an airline company at a check-in counter or the like is used instead of the passport. At this time, the use of the techniques according to the present invention makes it possible to identify a target passenger without disclosing facial information of the passenger between the airline company, and the customs, the boarding gate, or various places for shopping, and get only the passport information of the target passenger at each place.

The techniques according to the present invention can be used for also, for example, black list matching. Here, an example is described that a person appearing on a black list owned by an external organization is identified from among persons exist in a facility. A case is assumed that it is desired to find a person appearing on a black list of criminals or the like owned by the police or the like from among persons captured on a security camera owned by a manager (managing organization) of the facility. In such a case, the use of the present invention enables the high speed matching without disclosing facial information or the like of persons captured by the security camera in the facility to the owner (owing organization) of the black list by the manager (managing organization) of the facility, or without disclosing the black list to the manager (managing organization) of the facility.

Figure 12:
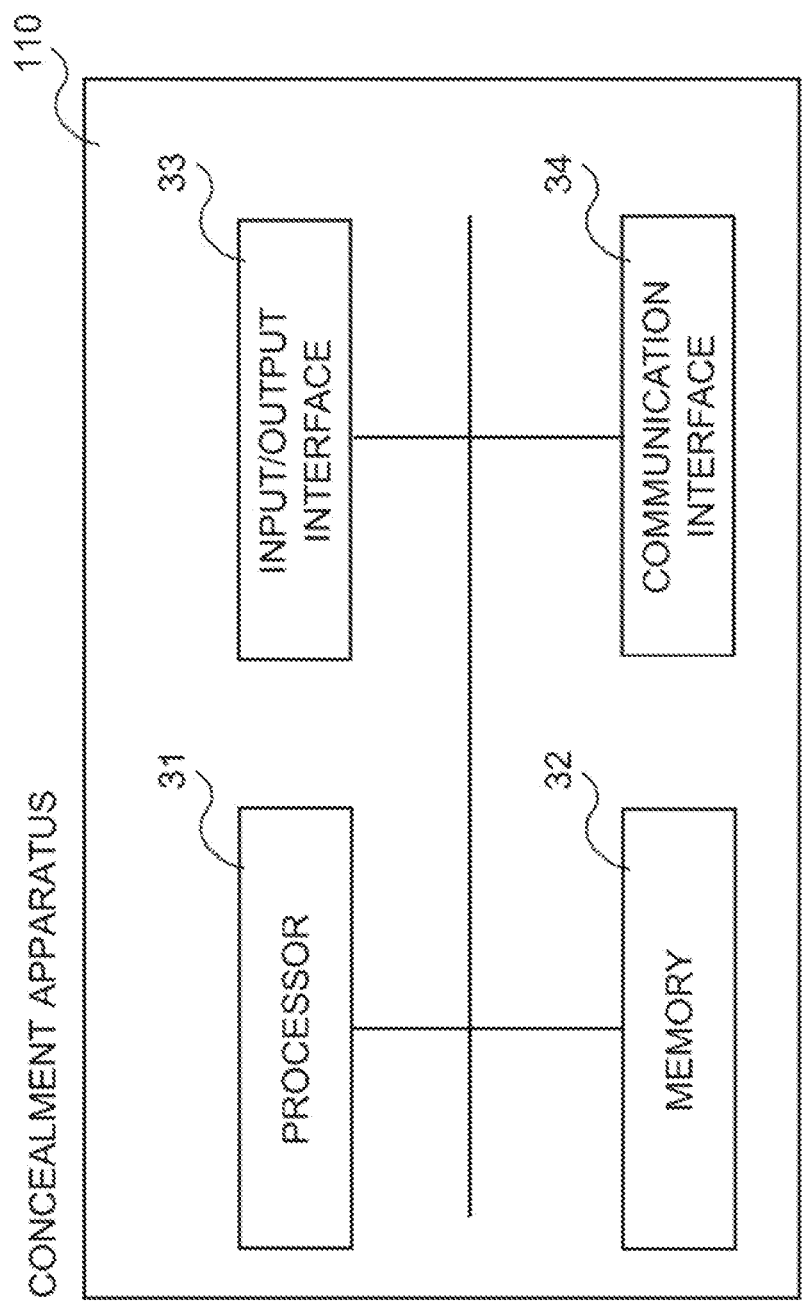
FIG. 12 is a diagram illustrating an example of a hardware configuration of a concealment apparatus.

Next, hardware of each apparatus configuring the information search system will be described. FIG. 12 is a diagram illustrating an example of a hardware configuration of the concealment apparatus 110.

The concealment apparatus 110 can be configured with an information processing apparatus (so-called, a computer), and includes a configuration illustrated in FIG. 12. For example, the concealment apparatus 110 includes a processor 31, a memory 32, an input/output interface 33, a communication interface 34, and the like. Constituent elements such as the processor 31 are connected to each other via an internal bus or the like, and are configured to be communicable with each other.

However, the configuration illustrated in FIG. 12 is not intended to limit the hardware configuration of the concealment apparatus 110. The concealment apparatus 110 may include hardware not illustrated, or need not include the input/output interface 33 as necessary. The number of processors 31 and the like included in the concealment apparatus 110 is not intended to limit to the example illustrated in FIG. 12, and for example, a plurality of processors 31 may be included in the concealment apparatus 110.

The processor 31 is, for example, a programmable device such as a central processing unit (CPU), a micro processing unit (MPU), and a digital signal processor (DSP). Alternatively, the processor 31 may be a device such as a field programmable gate array (FPGA) and an application specific integrated circuit (ASIC). The processor 31 executes various programs including an operating system (OS).

The memory 32 is a random access memory (RAM), a read only memory (ROM), a hard disk drive (HDD), a solid state drive (SSD), or the like. The memory 32 stores an OS program, an application program, and various pieces of data.

The input/output interface 33 is an interface of a display apparatus or an input apparatus (not illustrated). The display apparatus is, for example, a liquid crystal display or the like. The input apparatus is, for example, an apparatus that receives user operation, such as a keyboard and a mouse.

The communication interface 34 is a circuit, a module, or the like that performs communication with another apparatus. For example, the communication interface 34 includes a network interface card (NIC) or the like.

The function of the concealment apparatus 110 is implemented by various processing modules. Each of the processing modules is, for example, implemented by the processor 31 executing a program stored in the memory 32. The program can be recorded on a computer readable storage medium. The storage medium can be a non-transitory storage medium, such as a semiconductor memory, a hard disk, a magnetic recording medium, and an optical recording medium. In other words, the present invention can also be implemented as a computer program product. The program can be updated through downloading via a network, or by using a storage medium storing a program. In addition, the processing module may be implemented by a semiconductor chip.

Note that the decryption apparatus 120, the similarity calculating apparatus 130, and the information identifying apparatus 140 also can be configured by the information processing apparatus similar to the concealment apparatus 110, and their basic hardware structures are not different from the concealment apparatus 110, and thus, the descriptions thereof are omitted.

Example Alterations

Note that the configuration, the operation, and the like of the information matching system described in the example embodiments are merely examples, and are not intended to limit the configuration and the like of the system. For example, a database server or the like may be provided that stores the information (for example, concealed information, matching information, or the like) transmitted or received between the apparatuses to communicate the information via the database server.

In a plurality of flowcharts (sequence diagram) used in the above description, a plurality of steps (processes) are described in order, but the order of performing of the steps performed in each example embodiment is not limited to the described order. In each example embodiment, the illustrated order of processes can be changed as far as there is no problem with regard to processing contents, such as a change in which respective processes are executed in parallel, for example. The example embodiments described above can be combined in a scope that the contents do not conflict.

The whole or part of the example embodiments disclosed above can be described as, but not limited to, the following supplementary notes.
(Supplementary Note 1)

An information matching system comprises:

a concealment apparatus (10, 110, 210, 310, or 410);

a decryption apparatus (20, 120, 220, 320, or 420); and a similarity calculating apparatus (30, 130, 230, 330, or 430), wherein the concealment apparatus (10, 110, 210, 310, or 410) is configured to transmit, to the similarity calculating apparatus (30, 130, 230, 330, or 430), concealed information including information concealing obtained matching information by linear conversion using random numbers, the similarity calculating apparatus (30, 130, 230, 330, or 430) is configured to calculate, from obtained one or more pieces of registration information and the concealed information received from the concealment apparatus (10, 110, 210, 310, or 410), a concealed similarity which is a value concealing a similarity between the matching information and the registration information, and to transmit the calculated concealed similarity to the decryption apparatus (20, 120, 220, 320, or 420), and the decryption apparatus (20, 120, 220, 320, or 420) is configured to calculate the similarity between the matching information and the registration information from the concealed similarity received from the similarity calculating apparatus (30, 130, 230, 330, or 430), using the random numbers used by the concealment apparatus (10, 110, 210, 310, or 410).
(Supplementary Note 2)

The information matching system according to the supplementary note 1, further comprises:

an information identifying apparatus (140, 240, 340, or 440), wherein the similarity calculating apparatus (30, 130, 230, 330, or 430) is configured to further generate a transformation key and an inverse transformation key, and calculate a concealed similarity that is a value concealing a transformed value of the similarity between the matching information and the registration information from the obtained one or more pieces of registration information, the concealed information received from the concealment apparatus (10, 110, 210, 310, or 410), and the transformation key to transmit the calculated concealed similarity to the decryption apparatus (20, 120, 220, 320, or 420), the decryption apparatus (20, 120, 220, 320, or 420) is configured to calculate a transformed similarity that is a transformed value of the similarity between the matching information and the registration information from a concealed transformed similarity calculated by the similarity calculating apparatus (30, 130, 230, 330, or 430) using the random numbers used by the concealment apparatus (10, 110, 210, 310, or 410), and transmit the calculated transformed similarity to the information identifying apparatus (140, 240, 340, or 440), and the information identifying apparatus (140, 240, 340, or 440) is configured to calculate a similarity from the transformed similarity received from the decryption apparatus (20, 120, 220, 320, or 420) using the inverse transformation key.

(Supplementary Note 3)

The information matching system according to the supplementary note 1, wherein the concealment apparatus (10, 110, 210, 310, or 410) is configured to, before obtaining the matching information, transmit concealed random numbers concealing the obtained random numbers to the similarity calculating apparatus (30, 130, 230, 330, or 430), the similarity calculating apparatus (30, 130, 230, 330, or 430) is configured to calculate a first concealed similarity from the obtained one or more pieces of registration information and the concealed random numbers received from the concealment apparatus (10, 110, 210, 310, or 410), and transmit the calculated first concealed similarity in advance to the decryption apparatus (20, 120, 220, 320, or 420), the concealment apparatus (10, 110, 210, 310, or 410) is configured to transmit, after obtaining the matching information, concealed matching information concealing the obtained matching information by linear conversion using random numbers to the similarity calculating apparatus (30, 130, 230, 330, or 430), the similarity calculating apparatus (30, 130, 230, 330, or 430) is configured to calculate a second concealed similarity from the obtained one or more pieces of registration information and the concealed matching information received from the concealment apparatus (10, 110, 210, 310, or 410), and transmit the calculated second concealed similarity to the decryption apparatus (20, 120, 220, 320, or 420), and the decryption apparatus (20, 120, 220, 320, or 420) is configured to calculate a similarity between the matching information and the registration information from the first concealed similarity and the second concealed similarity using the random numbers used by the concealment apparatus (10, 110, 210, 310, or 410).

(Supplementary Note 4)

The information matching system according to the supplementary note 3, further comprises:

an information identifying apparatus (140, 240, 340, or 440), wherein the similarity calculating apparatus (30, 130, 230, 330, or 430) is configured to, before the concealment apparatus (10, 110, 210, 310, or 410) obtains the matching information, generate a transformation key and an inverse transformation key, calculate a first concealed transformed similarity from the obtained one or more pieces of registration information, the concealed random numbers received from the concealment apparatus (10, 110, 210, 310, or 410), and the transformation key, and transmit the calculated first concealed transformed similarity in advance to the decryption apparatus (20, 120, 220, 320, or 420), and after the concealment apparatus (10, 110, 210, 310, or 410) obtains the matching information, calculate a second concealed transformed similarity from the obtained one or more pieces of registration information, the concealed matching information received from the concealment apparatus (10, 110, 210, 310, or 410), and the transformation key, and transmit the calculated second concealed transformed similarity to the decryption apparatus (20, 120, 220, 320, or 420), the decryption apparatus (20, 120, 220, 320, or 420) is configured to calculate a transformed similarity that is a transformed value of the similarity between the matching information and the registration information from the first concealed transformed similarity and the second concealed transformed similarity calculated by the similarity calculating apparatus (30, 130, 230, 330, or 430) using the random numbers used by the concealment apparatus (10, 110, 210, 310, or 410), and transmit the calculated transformed similarity to the information identifying apparatus (140, 240, 340, or 440), and the information identifying apparatus (140, 240, 340, or 440) is configured to calculate a similarity from the transformed similarity using the inverse transformation key.

(Supplementary Note 5)

The information matching system according to the supplementary note 2 or 4, wherein the information identifying apparatus (140, 240, 340, or 440) is configured to identify the registration information matching the matching information based on the calculated similarity.

(Supplementary Note 6)

The information matching system according to any one the supplementary notes 1 to 5, wherein the concealment apparatus (10, 110, 210, 310, or 410) is configured to use two random numbers a and b, and a random number s that is a vector having a dimension the same as matching information x that is a vector to conceal the matching information in a form of ax−bs.

(Supplementary Note 7)

The information matching system according to any one of the supplementary notes 1 to 5, wherein the concealment apparatus (10, 110, 210, 310, or 410) is configured to use one random number b and two random number vectors s and t each having a dimension the same as matching information x that is a vector to conceal the matching information in a form of x−bs−t.

(Supplementary Note 8)

An information matching method comprises, in an information matching system including a concealment apparatus (10, 110, 210, 310, or 410), a decryption apparatus (20, 120, 220, 320, or 420), and a similarity calculating apparatus (30, 130, 230, 330, or 430):

transmitting, by the concealment apparatus (10, 110, 210, 310, or 410), to the similarity calculating apparatus (30, 130, 230, 330, or 430), concealed information including information concealing obtained matching information by linear conversion using random numbers;

calculating, by the similarity calculating apparatus (30, 130, 230, 330, or 430), from obtained one or more pieces of registration information and the concealed information received from the concealment apparatus (10, 110, 210, 310, or 410), a concealed similarity which is a value concealing a similarity between the matching information and the registration information, and to transmit the calculated concealed similarity to the decryption apparatus (20, 120, 220, 320, or 420); and calculating, by the decryption apparatus (20, 120, 220, 320, or 420), the similarity between the matching information and the registration information from the concealed similarity received from the similarity calculating apparatus (30, 130, 230, 330, or 430), using the random numbers used by the concealment apparatus (10, 110, 210, 310, or 410).

Note that the aspect of the supplementary note 8 can be expanded, similar to the aspect of the supplementary note 1, to the aspects of the supplementary notes 2 to 7.

Note that the disclosures of the cited literatures in the citation list are incorporated herein by reference. Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

REFERENCE SIGNS LIST 10, 110, 210, 310, 410 Concealment Apparatus
20, 120, 220, 320, 420 Decryption Apparatus
30, 130, 230, 330, 430 Similarity Calculating Apparatus
31 Processor
32 Memory
33 Input/Output Interface
34 Communication Interface
100, 200, 300, 400 Information Matching System
111, 211, 311, 411 Matching Information Acquiring Section
113, 213 Random Number Acquiring Section
114, 214, 314, 414 Main Random Number Transmitting Section
116 Concealment Section
118, 218 Concealed Information Transmitting Section
121, 221, 321, 421 Main Random Number Receiving Section
123 Concealed Similarity Receiving Section
124, 224, 324, 424 Decrypting Section
125, 225, 325, 425 Similarity Transmitting Section
132, 232 Concealed Information Receiving Section
133, 233, 333, 433 Registration Information Acquiring Section
137 Concealed Similarity Calculating Section
139 Concealed Similarity Transmitting Section
140, 240, 340, 440 Information Identifying Apparatus
142, 342 Similarity Receiving Section
144, 244, 344, 444 Information Identifying Section
216, 316, 416 Matching Information Concealment Section
223 Concealed Transformed Similarity Receiving Section
234, 434 Transformation Key Generating Section
235, 435 Inverse Transformation Key Transmitting Section
237 Concealed Transformed Similarity Calculating Section
238 Concealed Transformed Similarity Transmitting Section
241, 441 Inverse Transformation Key Receiving Section
242, 442 Transformed Similarity Receiving Section
243, 443 Inverse Transforming Section
312, 412 Preliminary Random Number Acquiring Section
313, 413 Main Random Number Acquiring Section
315, 415 Random Number Concealment Section
317, 417 Concealed Random Number Transmitting Section
318, 418 Concealed Matching Information Transmitting Section
322 First Concealed Similarity Receiving Section
323 Second Concealed Similarity Receiving Section
331, 431 Concealed Random Number Receiving Section
332, 432 Concealed Matching Information Receiving Section
336 First Concealed Similarity Calculating Section
337 Second Concealed Similarity Calculating Section
338 First Concealed Similarity Transmitting Section
339 Second Concealed Similarity Transmitting Section
422 First Concealed Transformed Similarity Receiving Section
423 Second Concealed Transformed Similarity Receiving Section
436 First Concealed Transformed Similarity Calculating Section
437 Second Concealed Transformed Similarity Calculating Section
438 First Concealed Transformed Similarity Transmitting Section
439 Second Concealed Transformed Similarity Transmitting Section

What is claimed is:

1. An information matching system comprising:
a concealment apparatus including a memory storing instructions and one or more processors configured to execute the instructions;
a decryption apparatus including a memory storing instructions and one or more processors configured to execute the instructions;
a similarity calculating apparatus including a memory storing instructions and one or more processors configured to execute the instructions; and
an information identifying apparatus including a memory storing instructions and one or more processors configured to execute the instructions, wherein
the concealment apparatus is configured to transmit, to the similarity calculating apparatus, concealed information including information concealing obtained matching information by linear conversion using random numbers,
the similarity calculating apparatus is configured to generate a transformation key and an inverse transformation key, to calculate, from obtained one or more pieces of registration information, the concealed information received from the concealment apparatus, and the transformation key, a concealed transformed similarity which is a value concealing a transformed similarity between the matching information and the registration information, and to transmit the calculated concealed transformed similarity to the decryption apparatus and the inverse transformation key to the information identifying apparatus,
the decryption apparatus is configured to calculate the transformed similarity between the matching information and the registration information from the concealed transformed similarity received from the similarity calculating apparatus, using the random numbers used by the concealment apparatus, and to transmit the calculated transformed similarity to the information identifying apparatus, and
the information identifying apparatus is configured to calculate a similarity from the transformed similarity received from the decryption apparatus using the inverse transformation key.

2. The information matching system according to claim 1, wherein the information identifying apparatus is configured to identify the registration information matching the matching information based on the calculated similarity.

3. The information matching system according to claim 1, wherein the concealment apparatus is configured to use two random numbers a and b, and a random number s that is a vector having a dimension that is the same as a dimension of matching information x that is a vector, to conceal the matching information in a form of ax-bs.

4. The information matching system according to claim 1, wherein the concealment apparatus is configured to use one random number b and two random number vectors s and t each having a dimension that is the same as a dimension of matching information x that is a vector to conceal the matching information in a form of x-bs-t.

5. An information matching method comprising, in an information matching system including a concealment apparatus, a decryption apparatus, a similarity calculating apparatus, and an information identifying apparatus:
- by the concealment apparatus, transmitting, to the similarity calculating apparatus, concealed information including information concealing obtained matching information by linear conversion using random numbers;
- by the similarity calculating apparatus, generating a transformation key and an inverse transformation key, calculating, from obtained one or more pieces of registration information the concealed information received from the concealment apparatus, and the transformation key, a concealed transformed similarity which is a value concealing a transformed similarity between the matching information and the registration information, and transmitting the calculated concealed transformed similarity to the decryption apparatus and the inverse transformation key to the information identifying apparatus;
- by the decryption apparatus, calculating the transformed similarity between the matching information and the registration information from the concealed transformed similarity received from the similarity calculating apparatus, using the random numbers used by the concealment apparatus, and transmitting the calculated transformed similarity to the information identifying apparatus; and
- by the information identifying apparatus, calculating a similarity from the transformed similarity received from the decryption apparatus using the inverse transformation key.

6. An information matching system comprising:
- a concealment apparatus including a memory storing instructions and one or more processors configured to execute the instructions;
- a decryption apparatus including a memory storing instructions and one or more processors configured to execute the instructions; and
- a similarity calculating apparatus including a memory storing instructions and one or more processors configured to execute the instructions, wherein
- the concealment apparatus is configured to, before obtaining matching information, transmit, to the similarity calculating apparatus, concealed random numbers,
- the concealment apparatus is configured to, after obtaining the matching information, transmit, to the similarity calculating apparatus, concealed information including information concealing the obtained matching information by linear conversion using the random numbers,
- the similarity calculating apparatus is configured to, before the concealment apparatus obtains the matching information, calculate, from obtained one or more pieces of registration information, and the concealed information received from the concealment apparatus, a first concealed similarity which is a value concealing a similarity between the matching information and the registration information, and to transmit the calculated first concealed similarity in advance to the decryption apparatus,
- the similarity calculating apparatus is configured to, after the concealment apparatus obtains the matching information, calculate, from the concealed matching information received from the concealment apparatus, a second concealed similarity, and to transmit the calculated second concealed similarity to the decryption apparatus, and
- the decryption apparatus is configured to calculate the similarity between the matching information and the registration information from the first and second concealed similarities using the random numbers used by the concealment apparatus.

7. The information matching system according to claim 6, further comprising:
- an information identifying apparatus including a memory storing instructions and one or more processors configured to execute the instructions, wherein
- the similarity calculating apparatus is configured to generate a transformation key and an inverse transformation key, and to transmit the inverse transformation key to the information identifying apparatus,
- the first concealed similarity value is a first concealed transformed similarity calculated further from the transformation key,
- the second concealed similarity value is a second concealed transformed similarity,
- the similarity is a transformed similarity that is a transformed value of an untransformed similarity between the matching information and the registration information,
- the decryption apparatus is configured to transmit the calculated transformed similarity to the information identifying apparatus, and
- the information identifying apparatus is configured to calculate the untransformed similarity from the transformed similarity using the inverse transformation key.

* * * * *